(12) United States Patent
Colgrove et al.

(10) Patent No.: US 11,650,976 B2
(45) Date of Patent: *May 16, 2023

(54) PATTERN MATCHING USING HASH TABLES IN STORAGE SYSTEM

(71) Applicant: Pure Storage, Inc., Mountain View, CA (US)

(72) Inventors: John Colgrove, Los Altos, CA (US); Joseph S. Hasbani, Mountain View, CA (US); John Hayes, Mountain View, CA (US); Ethan Miller, Santa Cruz, CA (US); Cary Sandvig, Isle La Motte, VT (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,346

(22) Filed: Apr. 22, 2022

(65) Prior Publication Data

US 2022/0245129 A1 Aug. 4, 2022

Related U.S. Application Data

(63) Continuation of application No. 16/114,027, filed on Aug. 27, 2018, now Pat. No. 10,540,343, which is a (Continued)

(51) Int. Cl.
| | |
|---|---|
| *G06F 12/00* | (2006.01) |
| *G06F 16/23* | (2019.01) |
| *G06F 16/174* | (2019.01) |
| *G06F 16/901* | (2019.01) |
| *G06F 3/06* | (2006.01) |

(52) U.S. Cl.
CPC .......... *G06F 16/2365* (2019.01); *G06F 3/067* (2013.01); *G06F 3/0608* (2013.01); *G06F 3/0619* (2013.01); *G06F 3/0637* (2013.01); *G06F 3/0641* (2013.01); *G06F 3/0689* (2013.01); *G06F 16/1748* (2019.01); *G06F 16/1752* (2019.01); *G06F 16/9017* (2019.01)

(58) Field of Classification Search
CPC ............ G06F 16/2365; G06F 16/1752; G06F 16/9017; G06F 16/1748; G06F 3/0608; G06F 3/0619; G06F 3/0637; G06F 3/0641; G06F 3/067; G06F 3/0689
See application file for complete search history.

(56) References Cited

U.S. PATENT DOCUMENTS

| | | | |
|---|---|---|---|
| 5,390,327 | A | 2/1995 | Lubbers et al. |
| 5,450,581 | A | 9/1995 | Bergen et al. |

(Continued)

FOREIGN PATENT DOCUMENTS

| | | |
|---|---|---|
| EP | 2164006 | 3/2010 |
| EP | 2256621 | 12/2010 |

(Continued)

OTHER PUBLICATIONS

Hwang, Kai, et al. "RAID-x: A New Distributed Disk Array for I/O-Centric Cluster Computing," HPDC '00 Proceedings of the 9th IEEE International Symposium on High Performance Distributed Computing, IEEE, 2000, pp. 279-286.

(Continued)

*Primary Examiner* — Gurtej Bansal

(57) ABSTRACT

A system and method for managing tables in a storage system is described.

20 Claims, 14 Drawing Sheets

Related U.S. Application Data continuation of application No. 15/803,510, filed on Nov. 3, 2017, now Pat. No. 10,061,798, which is a continuation of application No. 14/751,099, filed on Jun. 25, 2015, now Pat. No. 9,811,551, which is a continuation of application No. 14/083,152, filed on Nov. 18, 2013, now Pat. No. 9,069,786, which is a continuation of application No. 13/273,858, filed on Oct. 14, 2011, now Pat. No. 8,589,640.

(56) References Cited

U.S. PATENT DOCUMENTS

| | | | |
|---|---|---|---|
| 5,479,653 | A | 12/1995 | Jones |
| 5,488,731 | A | 1/1996 | Mendelsohn |
| 5,504,858 | A | 4/1996 | Ellis et al. |
| 5,564,113 | A | 10/1996 | Bergen et al. |
| 5,574,882 | A | 11/1996 | Menon et al. |
| 5,649,093 | A | 7/1997 | Hanko et al. |
| 5,883,909 | A | 3/1999 | Dekoning et al. |
| 6,000,010 | A | 12/1999 | Legg |
| 6,260,156 | B1 | 7/2001 | Garvin et al. |
| 6,269,453 | B1 | 7/2001 | Krantz |
| 6,275,898 | B1 | 8/2001 | DeKoning |
| 6,453,428 | B1 | 9/2002 | Stephenson |
| 6,523,087 | B2 | 2/2003 | Busser |
| 6,535,417 | B2 | 3/2003 | Tsuda |
| 6,643,748 | B1 | 11/2003 | Wieland |
| 6,725,392 | B1 | 4/2004 | Frey et al. |
| 6,763,455 | B2 | 7/2004 | Hall |
| 6,836,816 | B2 | 12/2004 | Kendall |
| 6,985,995 | B2 | 1/2006 | Holland et al. |
| 7,032,125 | B2 | 4/2006 | Holt et al. |
| 7,047,358 | B2 | 5/2006 | Lee et al. |
| 7,051,155 | B2 | 5/2006 | Talagala et al. |
| 7,055,058 | B2 | 5/2006 | Lee et al. |
| 7,065,617 | B2 | 6/2006 | Wang |
| 7,069,383 | B2 | 6/2006 | Yamamoto et al. |
| 7,076,606 | B2 | 7/2006 | Orsley |
| 7,107,480 | B1 | 9/2006 | Moshayedi et al. |
| 7,159,150 | B2 | 1/2007 | Kenchammana-Hosekote et al. |
| 7,162,575 | B2 | 1/2007 | Dalal et al. |
| 7,164,608 | B2 | 1/2007 | Lee |
| 7,188,270 | B1 | 3/2007 | Nanda et al. |
| 7,334,156 | B2 | 2/2008 | Land et al. |
| 7,370,220 | B1 | 5/2008 | Nguyen et al. |
| 7,386,666 | B1 | 6/2008 | Beauchamp et al. |
| 7,398,285 | B2 | 7/2008 | Kisley |
| 7,424,498 | B1 | 9/2008 | Patterson |
| 7,424,592 | B1 | 9/2008 | Karr |
| 7,444,532 | B2 | 10/2008 | Masuyama et al. |
| 7,480,658 | B2 | 1/2009 | Heinla et al. |
| 7,484,056 | B2 | 1/2009 | Madnani et al. |
| 7,484,057 | B1 | 1/2009 | Madnani et al. |
| 7,484,059 | B1 | 1/2009 | Ofer et al. |
| 7,536,506 | B2 | 5/2009 | Ashmore et al. |
| 7,558,859 | B2 | 7/2009 | Kasiolas |
| 7,565,446 | B2 | 7/2009 | Talagala et al. |
| 7,613,947 | B1 | 11/2009 | Coatney |
| 7,634,617 | B2 | 12/2009 | Misra |
| 7,634,618 | B2 | 12/2009 | Misra |
| 7,681,104 | B1 | 3/2010 | Sim-Tang et al. |
| 7,681,105 | B1 | 3/2010 | Sim-Tang et al. |
| 7,681,109 | B2 | 3/2010 | Yang et al. |
| 7,730,257 | B2 | 6/2010 | Franklin |
| 7,730,258 | B1 | 6/2010 | Smith |
| 7,730,274 | B1 | 6/2010 | Usgaonkar |
| 7,743,276 | B2 | 6/2010 | Jacobsen et al. |
| 7,752,489 | B2 | 7/2010 | Deenadhayalan et al. |
| 7,757,038 | B2 | 7/2010 | Kitahara |
| 7,757,059 | B1 | 7/2010 | Ofer et al. |
| 7,778,960 | B1 | 8/2010 | Chatterjee et al. |
| 7,783,955 | B2 | 8/2010 | Haratsch et al. |
| 7,814,272 | B2 | 10/2010 | Barrall et al. |
| 7,814,273 | B2 | 10/2010 | Barrall |
| 7,818,531 | B2 | 10/2010 | Barrall |
| 7,827,351 | B2 | 11/2010 | Suetsugu et al. |
| 7,827,439 | B2 | 11/2010 | Matthew et al. |
| 7,831,768 | B2 | 11/2010 | Ananthamurthy et al. |
| 7,856,583 | B1 | 12/2010 | Smith |
| 7,870,105 | B2 | 1/2011 | Arakawa et al. |
| 7,873,878 | B2 | 1/2011 | Belluomini et al. |
| 7,885,938 | B1 | 2/2011 | Greene et al. |
| 7,886,111 | B2 | 2/2011 | Klemm et al. |
| 7,908,448 | B1 | 3/2011 | Chatterjee et al. |
| 7,916,538 | B2 | 3/2011 | Jeon et al. |
| 7,921,268 | B2 | 4/2011 | Jakob |
| 7,930,499 | B2 | 4/2011 | Duchesne |
| 7,941,697 | B2 | 5/2011 | Mathew et al. |
| 7,958,303 | B2 | 6/2011 | Shuster |
| 7,971,129 | B2 | 6/2011 | Watson |
| 7,984,016 | B2 | 7/2011 | Kisley |
| 7,991,822 | B2 | 8/2011 | Bish et al. |
| 8,006,126 | B2 | 8/2011 | Deenadhayalan et al. |
| 8,010,485 | B1 | 8/2011 | Chatterjee et al. |
| 8,010,829 | B1 | 8/2011 | Chatterjee et al. |
| 8,020,047 | B2 | 9/2011 | Courtney |
| 8,046,548 | B1 | 10/2011 | Chatterjee et al. |
| 8,051,361 | B2 | 11/2011 | Sim-Tang et al. |
| 8,051,362 | B2 | 11/2011 | Li et al. |
| 8,074,038 | B2 | 12/2011 | Lionetti et al. |
| 8,082,393 | B2 | 12/2011 | Galloway et al. |
| 8,086,603 | B2 | 12/2011 | Nasre et al. |
| 8,086,634 | B2 | 12/2011 | Mimatsu |
| 8,086,911 | B1 | 12/2011 | Taylor |
| 8,090,837 | B2 | 1/2012 | Shin et al. |
| 8,108,502 | B2 | 1/2012 | Tabbara et al. |
| 8,117,388 | B2 | 2/2012 | Jernigan, IV |
| 8,117,521 | B2 | 2/2012 | Yang et al. |
| 8,140,821 | B1 | 3/2012 | Raizen et al. |
| 8,145,838 | B1 | 3/2012 | Miller et al. |
| 8,145,840 | B2 | 3/2012 | Koul et al. |
| 8,175,012 | B2 | 5/2012 | Haratsch et al. |
| 8,176,360 | B2 | 5/2012 | Frost et al. |
| 8,176,405 | B2 | 5/2012 | Hafner et al. |
| 8,180,855 | B2 | 5/2012 | Aiello et al. |
| 8,200,922 | B2 | 6/2012 | McKean et al. |
| 8,209,469 | B2 | 6/2012 | Carpenter et al. |
| 8,225,006 | B1 | 7/2012 | Karamcheti |
| 8,239,618 | B2 | 8/2012 | Kotzur et al. |
| 8,244,999 | B1 | 8/2012 | Chatterjee et al. |
| 8,261,016 | B1 | 9/2012 | Goel |
| 8,271,455 | B2 | 9/2012 | Kesselman |
| 8,285,686 | B2 | 10/2012 | Kesselman |
| 8,305,811 | B2 | 11/2012 | Jeon |
| 8,315,999 | B2 | 11/2012 | Chatley et al. |
| 8,327,080 | B1 | 12/2012 | Der |
| 8,335,769 | B2 | 12/2012 | Kesselman |
| 8,341,118 | B2 | 12/2012 | Drobychev et al. |
| 8,351,290 | B1 | 1/2013 | Huang et al. |
| 8,364,920 | B1 | 1/2013 | Parkison et al. |
| 8,365,041 | B2 | 1/2013 | Chu et al. |
| 8,375,146 | B2 | 2/2013 | Sinclair |
| 8,397,016 | B2 | 3/2013 | Talagala et al. |
| 8,402,152 | B2 | 3/2013 | Duran |
| 8,412,880 | B2 | 4/2013 | Leibowitz et al. |
| 8,423,739 | B2 | 4/2013 | Ash et al. |
| 8,429,436 | B2 | 4/2013 | Filingim et al. |
| 8,452,928 | B1 | 5/2013 | Ofer et al. |
| 8,473,698 | B2 | 6/2013 | Lionetti et al. |
| 8,473,778 | B2 | 6/2013 | Simitci |
| 8,473,815 | B2 | 6/2013 | Yu et al. |
| 8,479,037 | B1 | 7/2013 | Chatterjee et al. |
| 8,484,414 | B2 | 7/2013 | Sugimoto et al. |
| 8,498,967 | B1 | 7/2013 | Chatterjee et al. |
| 8,522,073 | B2 | 8/2013 | Cohen |
| 8,533,408 | B1 | 9/2013 | Madnani et al. |
| 8,533,527 | B2 | 9/2013 | Daikokuya et al. |
| 8,539,177 | B1 | 9/2013 | Ofer et al. |
| 8,544,029 | B2 | 9/2013 | Bakke et al. |
| 8,549,224 | B1 | 10/2013 | Zeryck et al. |
| 8,583,861 | B1 | 11/2013 | Ofer et al. |
| 8,589,625 | B2 | 11/2013 | Colgrove et al. |
| 8,595,455 | B2 | 11/2013 | Chatterjee et al. |
| 8,615,599 | B1 | 12/2013 | Takefman et al. |

(56) References Cited

U.S. PATENT DOCUMENTS

| | | |
|---|---|---|
| 8,627,136 B2 | 1/2014 | Shankar et al. |
| 8,627,138 B1 | 1/2014 | Clark |
| 8,639,669 B1 | 1/2014 | Douglis et al. |
| 8,639,863 B1 | 1/2014 | Kanapathippillai et al. |
| 8,640,000 B1 | 1/2014 | Cypher |
| 8,650,343 B1 | 2/2014 | Kanapathippillai et al. |
| 8,660,131 B2 | 2/2014 | Vermunt et al. |
| 8,661,218 B1 | 2/2014 | Piszczek et al. |
| 8,671,072 B1 | 3/2014 | Shah et al. |
| 8,689,042 B1 | 4/2014 | Kanapathippillai et al. |
| 8,700,875 B1 | 4/2014 | Barron et al. |
| 8,706,694 B2 | 4/2014 | Chatterjee et al. |
| 8,706,914 B2 | 4/2014 | Duchesneau |
| 8,706,932 B1 | 4/2014 | Kanapathippillai et al. |
| 8,712,963 B1 | 4/2014 | Douglis et al. |
| 8,713,405 B2 | 4/2014 | Healey et al. |
| 8,719,621 B1 | 5/2014 | Karmarkar |
| 8,725,730 B2 | 5/2014 | Keeton et al. |
| 8,751,859 B2 | 6/2014 | Becker-szendy et al. |
| 8,756,387 B2 | 6/2014 | Frost et al. |
| 8,762,793 B2 | 6/2014 | Grube et al. |
| 8,838,541 B2 | 6/2014 | Camble et al. |
| 8,769,232 B2 | 7/2014 | Suryabudi et al. |
| 8,775,858 B2 | 7/2014 | Gower et al. |
| 8,775,868 B2 | 7/2014 | Colgrove et al. |
| 8,788,913 B1 | 7/2014 | Xin et al. |
| 8,793,447 B2 | 7/2014 | Usgaonkar et al. |
| 8,799,746 B2 | 8/2014 | Baker et al. |
| 8,819,311 B2 | 8/2014 | Liao |
| 8,819,383 B1 | 8/2014 | Jobanputra et al. |
| 8,824,261 B1 | 9/2014 | Miller et al. |
| 8,832,528 B2 | 9/2014 | Thatcher et al. |
| 8,838,892 B2 | 9/2014 | Li |
| 8,843,700 B1 | 9/2014 | Salessi et al. |
| 8,850,108 B1 | 9/2014 | Hayes et al. |
| 8,850,288 B1 | 9/2014 | Lazier et al. |
| 8,856,593 B2 | 10/2014 | Eckhardt et al. |
| 8,856,619 B1 | 10/2014 | Cypher |
| 8,862,617 B2 | 10/2014 | Kesselman |
| 8,862,847 B2 | 10/2014 | Feng et al. |
| 8,862,928 B2 | 10/2014 | Xavier et al. |
| 8,868,825 B1 | 10/2014 | Hayes |
| 8,874,836 B1 | 10/2014 | Hayes |
| 8,880,793 B2 | 11/2014 | Nagineni |
| 8,880,825 B1 | 11/2014 | Lionetti et al. |
| 8,886,778 B2 | 11/2014 | Nedved et al. |
| 8,898,383 B2 | 11/2014 | Yamamoto et al. |
| 8,898,388 B1 | 11/2014 | Kimmel |
| 8,904,231 B2 | 12/2014 | Coatney et al. |
| 8,918,478 B2 | 12/2014 | Ozzie et al. |
| 8,930,307 B2 | 1/2015 | Colgrove et al. |
| 8,930,633 B2 | 1/2015 | Amit et al. |
| 8,943,357 B2 | 1/2015 | Atzmony |
| 8,949,502 B2 | 2/2015 | McKnight et al. |
| 8,959,110 B2 | 2/2015 | Smith et al. |
| 8,959,388 B1 | 2/2015 | Kuang et al. |
| 8,972,478 B1 | 3/2015 | Storer et al. |
| 8,972,779 B2 | 3/2015 | Lee et al. |
| 8,977,597 B2 | 3/2015 | Ganesh et al. |
| 8,996,828 B2 | 3/2015 | Kalos et al. |
| 9,003,144 B1 | 4/2015 | Hayes et al. |
| 9,009,724 B2 | 4/2015 | Gold et al. |
| 9,021,053 B2 | 4/2015 | Bernbo et al. |
| 9,021,215 B2 | 4/2015 | Meir et al. |
| 9,025,393 B2 | 5/2015 | Wu |
| 9,043,372 B2 | 5/2015 | Makkar et al. |
| 9,047,214 B1 | 6/2015 | Sharon et al. |
| 9,053,808 B2 | 6/2015 | Sprouse |
| 9,058,155 B2 | 6/2015 | Cepulis et al. |
| 9,063,895 B1 | 6/2015 | Madnani et al. |
| 9,063,896 B1 | 6/2015 | Madnani et al. |
| 9,098,211 B1 | 8/2015 | Madnani et al. |
| 9,110,898 B1 | 8/2015 | Chamness et al. |
| 9,110,964 B1 | 8/2015 | Shilane et al. |
| 9,116,819 B2 | 8/2015 | Cope et al. |
| 9,117,536 B2 | 8/2015 | Yoon |
| 9,122,401 B2 | 9/2015 | Zaltsman et al. |
| 9,123,422 B2 | 9/2015 | Sharon et al. |
| 9,124,300 B2 | 9/2015 | Olbrich et al. |
| 9,134,908 B2 | 9/2015 | Horn et al. |
| 9,153,337 B2 | 10/2015 | Sutardja |
| 9,158,472 B2 | 10/2015 | Kesselman et al. |
| 9,159,422 B1 | 10/2015 | Lee et al. |
| 9,164,891 B2 | 10/2015 | Karamcheti et al. |
| 9,183,136 B2 | 11/2015 | Kawamura et al. |
| 9,189,650 B2 | 11/2015 | Jaye et al. |
| 9,201,733 B2 | 12/2015 | Verma |
| 9,207,876 B2 | 12/2015 | Shu et al. |
| 9,229,656 B1 | 1/2016 | Contreras et al. |
| 9,229,810 B2 | 1/2016 | He et al. |
| 9,235,475 B1 | 1/2016 | Shilane et al. |
| 9,244,626 B2 | 1/2016 | Shah et al. |
| 9,250,999 B1 | 2/2016 | Barroso |
| 9,251,066 B2 | 2/2016 | Colgrove et al. |
| 9,268,648 B1 | 2/2016 | Barash et al. |
| 9,268,806 B1 | 2/2016 | Kesselman et al. |
| 9,286,002 B1 | 3/2016 | Karamcheti et al. |
| 9,292,214 B2 | 3/2016 | Kalos et al. |
| 9,298,760 B1 | 3/2016 | Li et al. |
| 9,304,908 B1 | 4/2016 | Karamcheti et al. |
| 9,311,969 B2 | 4/2016 | Murin |
| 9,311,970 B2 | 4/2016 | Sharon et al. |
| 9,323,663 B2 | 4/2016 | Karamcheti et al. |
| 9,323,667 B2 | 4/2016 | Bennett |
| 9,323,681 B2 | 4/2016 | Apostolides et al. |
| 9,335,942 B2 | 5/2016 | Kumar et al. |
| 9,348,538 B2 | 5/2016 | Mallaiah et al. |
| 9,355,022 B2 | 5/2016 | Ravimohan et al. |
| 9,384,082 B1 | 7/2016 | Lee et al. |
| 9,384,252 B2 | 7/2016 | Akirav et al. |
| 9,389,958 B2 | 7/2016 | Sundaram et al. |
| 9,390,019 B2 | 7/2016 | Patterson et al. |
| 9,396,202 B1 | 7/2016 | Drobychev et al. |
| 9,400,828 B2 | 7/2016 | Kesselman et al. |
| 9,405,478 B2 | 8/2016 | Koseki et al. |
| 9,411,685 B2 | 8/2016 | Lee |
| 9,417,960 B2 | 8/2016 | Klein |
| 9,417,963 B2 | 8/2016 | He et al. |
| 9,430,250 B2 | 8/2016 | Hamid et al. |
| 9,430,542 B2 | 8/2016 | Akirav et al. |
| 9,432,541 B2 | 8/2016 | Ishida |
| 9,454,434 B2 | 9/2016 | Sundaram et al. |
| 9,471,579 B1 | 10/2016 | Natanzon |
| 9,477,554 B2 | 10/2016 | Chamness et al. |
| 9,477,632 B2 | 10/2016 | Du |
| 9,501,398 B2 | 11/2016 | George et al. |
| 9,525,737 B2 | 12/2016 | Friedman |
| 9,529,542 B2 | 12/2016 | Friedman et al. |
| 9,535,631 B2 | 1/2017 | Fu et al. |
| 9,552,248 B2 | 1/2017 | Miller et al. |
| 9,552,291 B2 | 1/2017 | Munetoh et al. |
| 9,552,299 B2 | 1/2017 | Stalzer |
| 9,563,517 B1 | 2/2017 | Natanzon et al. |
| 9,588,698 B1 | 3/2017 | Karamcheti et al. |
| 9,588,712 B2 | 3/2017 | Kalos et al. |
| 9,594,652 B1 | 3/2017 | Sathiamoorthy et al. |
| 9,600,193 B2 | 3/2017 | Ahrens et al. |
| 9,619,321 B1 | 4/2017 | Sharon et al. |
| 9,619,430 B2 | 4/2017 | Kannan et al. |
| 9,645,754 B2 | 5/2017 | Li et al. |
| 9,667,720 B1 | 5/2017 | Bent et al. |
| 9,710,535 B2 | 7/2017 | Aizman et al. |
| 9,733,840 B2 | 8/2017 | Karamcheti et al. |
| 9,734,225 B2 | 8/2017 | Akirav et al. |
| 9,740,403 B2 | 8/2017 | Storer et al. |
| 9,740,700 B1 | 8/2017 | Chopra et al. |
| 9,740,762 B2 | 8/2017 | Horowitz et al. |
| 9,747,319 B2 | 8/2017 | Bestler et al. |
| 9,747,320 B2 | 8/2017 | Kesselman |
| 9,767,130 B2 | 9/2017 | Bestler et al. |
| 9,781,227 B2 | 10/2017 | Friedman et al. |
| 9,785,498 B2 | 10/2017 | Misra et al. |
| 9,798,486 B1 | 10/2017 | Singh |
| 9,804,925 B1 | 10/2017 | Carmi et al. |

(56) References Cited

U.S. PATENT DOCUMENTS

| | | |
|---|---|---|
| 9,811,285 B1 | 11/2017 | Karamcheti et al. |
| 9,811,546 B1 | 11/2017 | Bent et al. |
| 9,818,478 B2 | 11/2017 | Chung |
| 9,829,066 B2 | 11/2017 | Thomas et al. |
| 9,836,245 B2 | 12/2017 | Hayes et al. |
| 9,891,854 B2 | 2/2018 | Munetoh et al. |
| 9,891,860 B1 | 2/2018 | Delgado et al. |
| 9,892,005 B2 | 2/2018 | Kedem et al. |
| 9,892,186 B2 | 2/2018 | Akirav et al. |
| 9,904,589 B1 | 2/2018 | Donlan et al. |
| 9,904,717 B2 | 2/2018 | Anglin et al. |
| 9,952,809 B2 | 2/2018 | Shah |
| 9,910,748 B2 | 3/2018 | Pan |
| 9,910,904 B2 | 3/2018 | Anglin et al. |
| 9,934,237 B1 | 4/2018 | Shilane et al. |
| 9,940,065 B2 | 4/2018 | Kalos et al. |
| 9,946,604 B1 | 4/2018 | Glass |
| 9,959,167 B1 | 5/2018 | Donlan et al. |
| 9,965,539 B2 | 5/2018 | D'halluin et al. |
| 9,998,539 B1 | 6/2018 | Brock et al. |
| 10,007,457 B2 | 6/2018 | Hayes et al. |
| 10,013,177 B2 | 7/2018 | Liu et al. |
| 10,013,311 B2 | 7/2018 | Sundaram et al. |
| 10,019,314 B2 | 7/2018 | Litsyn et al. |
| 10,019,317 B2 | 7/2018 | Usvyatsky et al. |
| 10,031,703 B1 | 7/2018 | Natanzon et al. |
| 10,061,512 B2 | 8/2018 | Chu et al. |
| 10,073,626 B2 | 9/2018 | Karamcheti et al. |
| 10,082,985 B2 | 9/2018 | Hayes et al. |
| 10,089,012 B1 | 10/2018 | Chen et al. |
| 10,089,174 B2 | 10/2018 | Lin |
| 10,089,176 B1 | 10/2018 | Donlan et al. |
| 10,108,819 B1 | 10/2018 | Donlan et al. |
| 10,146,787 B2 | 12/2018 | Bashyam et al. |
| 10,152,268 B1 | 12/2018 | Chakraborty et al. |
| 10,157,098 B2 | 12/2018 | Chung et al. |
| 10,162,704 B1 | 12/2018 | Kirschner et al. |
| 10,180,875 B2 | 1/2019 | Northcott |
| 10,185,730 B2 | 1/2019 | Bestler et al. |
| 10,235,065 B1 | 3/2019 | Miller et al. |
| 2002/0144059 A1 | 10/2002 | Kendall |
| 2003/0105984 A1 | 6/2003 | Masuyama et al. |
| 2003/0110205 A1 | 6/2003 | Johnson |
| 2004/0161086 A1 | 8/2004 | Buntin et al. |
| 2005/0001652 A1 | 1/2005 | Malik et al. |
| 2005/0076228 A1 | 4/2005 | Davis et al. |
| 2005/0235132 A1 | 10/2005 | Karr et al. |
| 2005/0278460 A1 | 12/2005 | Shin et al. |
| 2005/0283649 A1 | 12/2005 | Turner et al. |
| 2006/0015683 A1 | 1/2006 | Ashmore et al. |
| 2006/0114930 A1 | 6/2006 | Lucas et al. |
| 2006/0174157 A1 | 8/2006 | Barrall et al. |
| 2006/0248294 A1 | 11/2006 | Nedved et al. |
| 2007/0079068 A1 | 4/2007 | Draggon |
| 2007/0214194 A1 | 9/2007 | Reuter |
| 2007/0214314 A1 | 9/2007 | Reuter |
| 2007/0234016 A1 | 10/2007 | Davis et al. |
| 2007/0268905 A1 | 11/2007 | Baker et al. |
| 2008/0080709 A1 | 4/2008 | Michtchenko et al. |
| 2008/0107274 A1 | 5/2008 | Worthy |
| 2008/0155191 A1 | 6/2008 | Anderson et al. |
| 2008/0295118 A1 | 11/2008 | Liao |
| 2009/0077208 A1 | 3/2009 | Nguyen et al. |
| 2009/0138654 A1 | 5/2009 | Sutardja |
| 2009/0216910 A1 | 8/2009 | Duchesneau |
| 2009/0216920 A1 | 8/2009 | Lauterbach et al. |
| 2010/0017444 A1 | 1/2010 | Chatterjee et al. |
| 2010/0042636 A1 | 2/2010 | Lu |
| 2010/0094806 A1 | 4/2010 | Apostolides et al. |
| 2010/0115070 A1 | 5/2010 | Missimilly |
| 2010/0125695 A1 | 5/2010 | Wu et al. |
| 2010/0162076 A1 | 6/2010 | Sim-Tang et al. |
| 2010/0169707 A1 | 7/2010 | Mathew et al. |
| 2010/0174576 A1 | 7/2010 | Naylor |
| 2010/0268908 A1 | 10/2010 | Ouyang et al. |
| 2011/0040925 A1 | 2/2011 | Frost et al. |
| 2011/0060927 A1 | 3/2011 | Fillingim et al. |
| 2011/0119462 A1 | 5/2011 | Leach et al. |
| 2011/0219170 A1 | 9/2011 | Frost et al. |
| 2011/0238625 A1 | 9/2011 | Hamaguchi et al. |
| 2011/0264843 A1 | 10/2011 | Haines et al. |
| 2011/0302369 A1 | 12/2011 | Goto et al. |
| 2012/0011398 A1 | 1/2012 | Eckhardt |
| 2012/0079318 A1 | 3/2012 | Colgrove et al. |
| 2012/0089567 A1 | 4/2012 | Takahashi et al. |
| 2012/0110249 A1 | 5/2012 | Jeong et al. |
| 2012/0131253 A1 | 5/2012 | McKnight |
| 2012/0158923 A1 | 6/2012 | Mohamed et al. |
| 2012/0191900 A1 | 7/2012 | Kunimatsu et al. |
| 2012/0198152 A1 | 8/2012 | Terry et al. |
| 2012/0198261 A1 | 8/2012 | Brown et al. |
| 2012/0209943 A1 | 8/2012 | Jung |
| 2012/0226934 A1 | 9/2012 | Rao |
| 2012/0246435 A1 | 9/2012 | Meir et al. |
| 2012/0260055 A1 | 10/2012 | Murase |
| 2012/0311557 A1 | 12/2012 | Resch |
| 2013/0022201 A1 | 1/2013 | Glew et al. |
| 2013/0036314 A1 | 2/2013 | Glew et al. |
| 2013/0042056 A1 | 2/2013 | Shats |
| 2013/0060884 A1 | 3/2013 | Bernbo et al. |
| 2013/0067188 A1 | 3/2013 | Mehra et al. |
| 2013/0073894 A1 | 3/2013 | Xavier et al. |
| 2013/0124776 A1 | 5/2013 | Hallak et al. |
| 2013/0132800 A1 | 5/2013 | Healy et al. |
| 2013/0151653 A1 | 6/2013 | Sawiki |
| 2013/0151771 A1 | 6/2013 | Tsukahara et al. |
| 2013/0173853 A1 | 7/2013 | Ungureanu et al. |
| 2013/0238554 A1 | 9/2013 | Yucel et al. |
| 2013/0339314 A1 | 12/2013 | Carpenter et al. |
| 2013/0339635 A1 | 12/2013 | Amit et al. |
| 2013/0339818 A1 | 12/2013 | Baker et al. |
| 2014/0040535 A1 | 2/2014 | Lee |
| 2014/0040702 A1 | 2/2014 | He et al. |
| 2014/0047263 A1 | 2/2014 | Coatney et al. |
| 2014/0047269 A1 | 2/2014 | Kim |
| 2014/0063721 A1 | 3/2014 | Herman et al. |
| 2014/0064048 A1 | 3/2014 | Cohen et al. |
| 2014/0068224 A1 | 3/2014 | Fan et al. |
| 2014/0075252 A1 | 3/2014 | Luo et al. |
| 2014/0122510 A1 | 5/2014 | Namkoong et al. |
| 2014/0136880 A1 | 5/2014 | Shankar et al. |
| 2014/0181402 A1 | 6/2014 | White |
| 2014/0237164 A1 | 8/2014 | Le et al. |
| 2014/0279936 A1 | 9/2014 | Bernbo et al. |
| 2014/0280025 A1 | 9/2014 | Eidson et al. |
| 2014/0289588 A1 | 9/2014 | Nagadomi et al. |
| 2014/0330785 A1 | 11/2014 | Isherwood et al. |
| 2014/0372838 A1 | 12/2014 | Lou et al. |
| 2014/0380125 A1 | 12/2014 | Calder et al. |
| 2014/0380126 A1 | 12/2014 | Yekhanin et al. |
| 2015/0032720 A1 | 1/2015 | James |
| 2015/0039645 A1 | 2/2015 | Lewis |
| 2015/0039849 A1 | 2/2015 | Lewis |
| 2015/0089283 A1 | 3/2015 | Kermarrec et al. |
| 2015/0100746 A1 | 4/2015 | Rychlik |
| 2015/0134824 A1 | 5/2015 | Mickens |
| 2015/0153800 A1 | 6/2015 | Lucas et al. |
| 2015/0180714 A1 | 6/2015 | Chunn |
| 2015/0280959 A1 | 10/2015 | Vincent |
| 2016/0246537 A1 | 2/2016 | Kim |
| 2016/0191508 A1 | 6/2016 | Bestler et al. |
| 2016/0378612 A1 | 12/2016 | Hipsh et al. |
| 2017/0091236 A1 | 3/2017 | Hayes et al. |
| 2017/0103092 A1 | 4/2017 | Hu et al. |
| 2017/0103094 A1 | 4/2017 | Hu et al. |
| 2017/0103098 A1 | 4/2017 | Hu et al. |
| 2017/0103116 A1 | 4/2017 | Hu et al. |
| 2017/0177236 A1 | 6/2017 | Haratsch et al. |
| 2018/0039442 A1 | 2/2018 | Shadrin et al. |
| 2018/0081958 A1 | 3/2018 | Akirav et al. |
| 2018/0101441 A1 | 4/2018 | Hyun et al. |
| 2018/0101587 A1 | 4/2018 | Anglin et al. |
| 2018/0101588 A1 | 4/2018 | Anglin et al. |
| 2018/0217756 A1 | 8/2018 | Liu et al. |

(56) References Cited

U.S. PATENT DOCUMENTS

| | | |
|---|---|---|
| 2018/0307560 A1 | 10/2018 | Vishnumolakala et al. |
| 2018/0321874 A1 | 11/2018 | Li et al. |
| 2019/0036703 A1 | 1/2019 | Bestler |

FOREIGN PATENT DOCUMENTS

| | | |
|---|---|---|
| WO | WO 02-13033 | 2/2002 |
| WO | WO 2008103569 | 8/2008 |
| WO | WO 2008157081 | 12/2008 |
| WO | WO 2013032825 | 7/2013 |

OTHER PUBLICATIONS

Schmid, Patrick: "RAID Scaling Charts, Part 3:4-128 kB Stripes Compared", Tom's Hardware, Nov. 27, 2007 (http://www.tomshardware.com/reviews/RAID-SCALING-CHARTS.1735-4.html), See pp. 1-2.

Storer, Mark W. et al., "Pergamum: Replacing Tape with Energy Efficient, Reliable, Disk-Based Archival Storage," Fast '08: 6th USENIX Conference on File and Storage Technologies, San Jose, CA, Feb. 26-29, 2008 pp. 1-16.

Ju-Kyeong Kim et al., "Data Access Frequency based Data Replication Method using Erasure Codes in Cloud Storage System", Journal of the Institute of Electronics and Information Engineers, Feb. 2014, vol. 51, No. 2, pp. 85-91.

International Search Report and the Written Opinion of the International Searching Authority, PCT/US2015/018169, dated May 15, 2015.

International Search Report and the Written Opinion of the International Searching Authority, PCT/US2015/034302, dated Sep. 11, 2015.

International Search Report and the Written Opinion of the International Searching Authority, PCT/US2015/039135, dated Sep. 18, 2015.

International Search Report and the Written Opinion of the International Searching Authority, PCT/US2015/039136, dated Sep. 23, 2015.

International Search Report, PCT/US2015/039142, dated Sep. 24, 2015.

International Search Report, PCT/US2015/034291, dated Sep. 30, 2015.

International Search Report and the Written Opinion of the International Searching Authority, PCT/US2015/039137, dated Oct. 1, 2015.

International Search Report, PCT/US2015/044370, dated Dec. 15, 2015.

International Search Report amd the Written Opinion of the International Searching Authority, PCT/US2016/031039, dated May 5, 2016.

International Search Report, PCT/US2016/014604, dated May 19, 2016.

International Search Report, PCT/US2016/014361, dated May 30, 2016.

International Search Report, PCT/US2016/014356, dated Jun. 28, 2016.

International Search Report, PCT/US2016/014357, dated Jun. 29, 2016.

International Seach Report and the Written Opinion of the International Searching Authority, PCT/US2016/016504, dated Jul. 6, 2016.

International Seach Report and the Written Opinion of the International Searching Authority, PCT/US2016/024391, dated Jul. 12, 2016.

International Seach Report and the Written Opinion of the International Searching Authority, PCT/US2016/026529, dated Jul. 19, 2016.

International Seach Report and the Written Opinion of the International Searching Authority, PCT/US2016/023485, dated Jul. 21, 2016.

International Seach Report and the Written Opinion of the International Searching Authority, PCT/US2016/033306, dated Aug. 19, 2016.

International Seach Report and the Written Opinion of the International Searching Authority, PCT/US2016/047808, dated Nov. 25, 2016.

Stalzer, Mark A., "FlashBlades: System Architecture and Applications," Proceedings of the 2nd Workshop on Architectures and Systems for Big Data, Association for Computing Machinery, New York, NY, 2012, pp. 10-14.

International Seach Report and the Written Opinion of the International Searching Authority, PCT/US2016/042147, dated Nov. 30, 2016.

PATTERN MATCHING USING HASH TABLES IN STORAGE SYSTEM

BACKGROUND OF THE INVENTION

Field of the Invention

This invention relates to computer network attached storage systems, and, more particularly, to efficiently removing duplicate data blocks at a fine-granularity from a storage array.

Description of the Related Art

As computer memory storage and data bandwidth increase, so does the amount and complexity of data that businesses manage. Large-scale distributed storage systems, such as data centers, typically run many business operations. Computer systems that include multiple clients interconnected by a network increasingly share a distributed storage system. If the distributed storage system has poor performance or becomes unavailable, company operations may be impaired or stopped completely. Such distributed storage systems seek to maintain high standards for data availability and high-performance functionality. As used herein, storage disks may be referred to as storage devices as some types of storage technologies do not include disks.

Shared storage typically holds a large amount of data, which may include a substantial quantity of duplicate data. This duplicate data may result from an accidental process such as independent end-users copying the same data. In addition, a deliberate process such as creating a backup or replicating data may cause the duplicate data. In other cases, duplicate data is simply incidental, such as when a shared storage system holds multiple virtual machine files, all of which are derived from a common template. Whatever the cause, removing duplicate data, and therefore reducing the amount of storage utilized and reducing data transferred during backups and other data transfer activities, may increase performance. Additionally, reducing the amount of redundant data stored may improve storage efficiency and may reduce overall costs. Further, improved efficiencies may in turn enable the use of more expensive storage technologies, which may provide improved performance.

One example of a relatively cheap storage technology is the hard disk drive (HDD). HDDs generally comprise one or more rotating disks, each coated with a magnetic medium. These disks typically rotate at a rate of several thousand rotations per minute. In addition, a magnetic actuator is responsible for positioning magnetic read/write devices over the rotating disks. On the other hand, an example of a relatively expensive storage technology is Solid State Storage or a Solid-State Disk (SSD). A Solid-State Disk may also be referred to as a Solid-State Drive. SSDs may emulate an HDD interface, but utilize solid-state memory to store persistent data rather than electromechanical devices such as those found in a HDD. For example, an SSD may use Flash memory to store data. Without moving parts or mechanical delays, such an SSD may have lower read access latencies than hard disk drives. In some cases, write latencies for a solid state devices may be much greater than read latencies for the same device. No matter what technology is used for storage, deduplication is often desired to improve storage efficiency. In many storage systems, software applications such as a logical volume manager or a disk array manager are used to allocate space on mass-storage arrays. However, these applications generally operate and provide mappings at a relatively coarse level of granularity. Consequently, locating and removing duplicate data may be limited to relatively large chunks of data, which in turn may lead to inefficient deduplication. Additionally, while deduplication can improve storage efficiency, deduplication can also slow down certain storage related operations—such as write requests. The results of deduplication may also cause storage-related operations such as reads to run more slowly. Consequently, when and how deduplication is performed is important as well.

In view of the above, systems and methods for efficiently removing duplicate data blocks at a fine-granularity from a storage array and subsequently accessing them efficiently are desired.

SUMMARY OF THE INVENTION

Various embodiments of a storage system and methods for efficiently managing duplication of data in a storage array are disclosed.

These and other embodiments will become apparent upon consideration of the following description and accompanying drawings.

Figure 1:
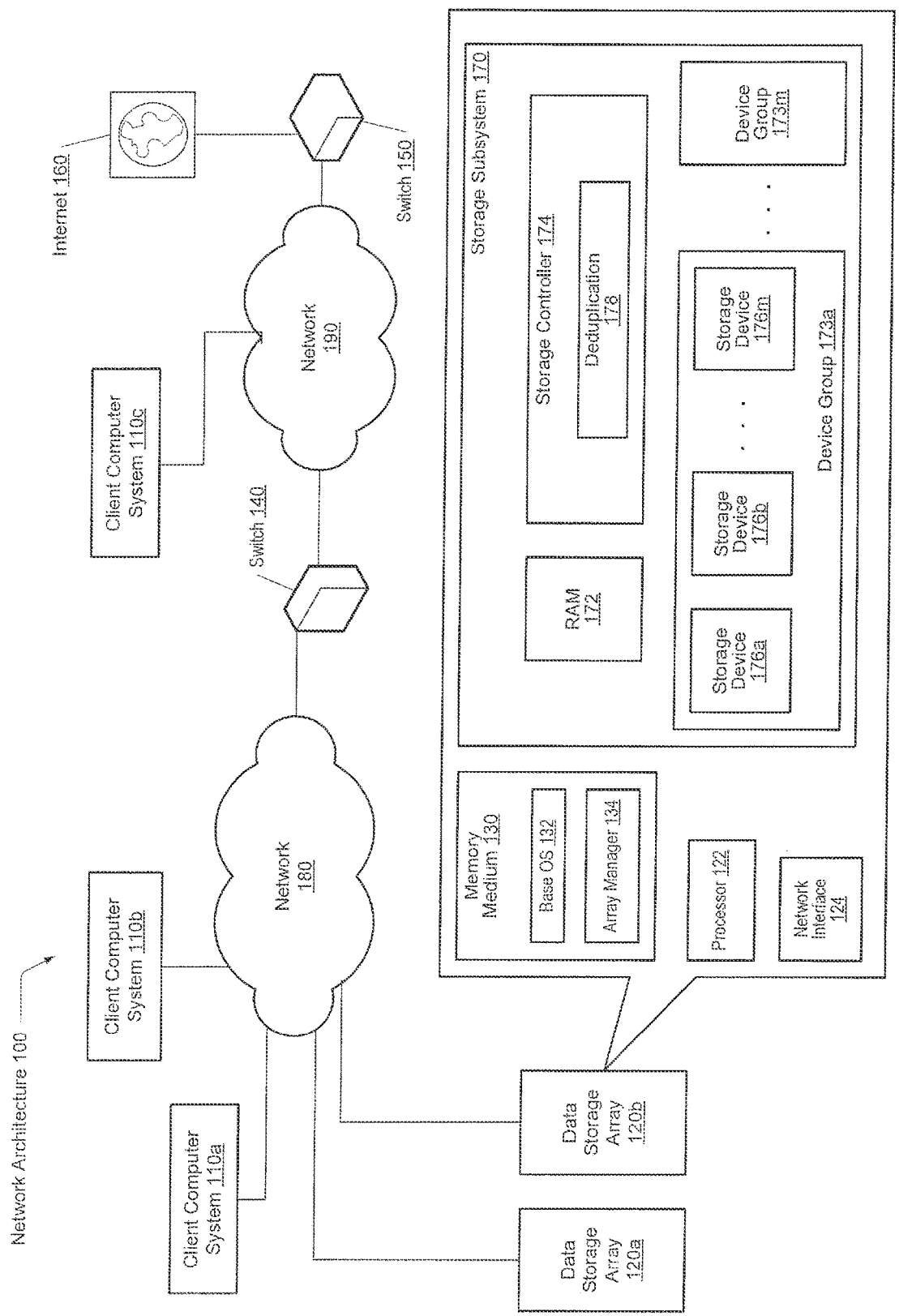
FIG. 1 is a generalized block diagram illustrating one embodiment of network architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram of one embodiment of a network architecture 100 is shown. As described further below, one embodiment of network architecture 100 includes client computer systems 110a-110b interconnected to one another through a network 180 and to data storage arrays 120a-120b. Network 180 may be coupled to a second network 190 through a switch 140. Client computer system 110c is coupled to client computer systems 110a-110b and data storage arrays 120a-120b via network 190. In addition, network 190 may be coupled to the Internet 160 or other outside network through switch 150.

It is noted that in alternative embodiments, the number and type of client computers and servers, switches, networks, data storage arrays, and data storage devices is not limited to those shown in FIG. 1. At various times one or more clients may operate offline. In addition, during operation, individual client computer connection types may change as users connect, disconnect, and reconnect to network architecture 100. Further, while the present description generally discusses network attached storage, the systems and methods described herein may also be applied to directly attached storage systems and may include a host operating system configured to perform one or more aspects of the described methods. Numerous such alternatives are possible and are contemplated.

Network architecture 100 includes client computer systems 110a-110c interconnected through networks 180 and 190 to one another and to data storage arrays 120a-120b. Networks 180 and 190 may include a variety of techniques including wireless connection, direct local area network (LAN) connections, storage area networks (SANs), wide area network (WAN) connections such as the Internet, a router, and others. Networks 180 and 190 may comprise one or more LANs that may also be wireless. Networks 180 and 190 may further include remote direct memory access (RDMA) hardware and/or software, transmission control protocol/internet protocol (TCP/IP) hardware and/or software, router, repeaters, switches, grids, and/or others. Protocols such as Ethernet, Fibre Channel, Fibre Channel over Ethernet (FCoE), iSCSI and so forth, may be used in networks 180 and 190. Switch 140 may utilize a protocol associated with both networks 180 and 190. The network 190 may interface with a set of communications protocols used for the Internet 160 such as the Transmission Control Protocol (TCP) and the Internet Protocol (IP), or TCP/IP. Switch 150 may be a TCP/IP switch.

Client computer systems 110a-110c are representative of any number of stationary or mobile computers such as desktop personal computers (PCs), workstations, laptops, handheld computers, servers, server farms, personal digital assistants (PDAs), smart phones, and so forth. Generally speaking, client computer systems 110a-110c include one or more processors comprising one or more processor cores.

Each processor core includes circuitry for executing instructions according to a predefined general-purpose instruction set. For example, the x86 instruction set architecture may be selected. Alternatively, the Alpha®, PowerPC®, SPARC®, or any other general-purpose instruction set architecture may be selected. The processor cores may access cache memory subsystems for data and computer program instructions. The cache subsystems may be coupled to a memory (storage) hierarchy comprising random access memory (RAM) and a storage device.

Each processor core and memory hierarchy within a client computer system may be in turn connected to a network interface. In addition to hardware components, each of the client computer systems 110a-110c may include a base operating system (OS) stored within the memory hierarchy. The base OS may be representative of any of a variety of specific operating systems, such as, for example, MS-DOS®, MS-WINDOWS®, OS/2®, UNIX®, Linux®, Solaris® or another known operating system. As such, the base OS may be operable to provide various services to the end-user and provide a software framework operable to support the execution of various programs. Additionally, each of the client computer systems 110a-110c may include a hypervisor used to support higher-level virtual machines (VMs). As is well known to those skilled in the art, virtualization may be used in desktops and servers to fully or partially decouple software, such as an OS, from a system's hardware. Virtualization may provide an end-user with an illusion of multiple OSes running on a same machine each having its own resources, such logical storage entities (e.g., logical unit numbers, LUNs) corresponding to the storage devices 176a-176m within each of the data storage arrays 120a-120b.

Each of the data storage arrays 120a-120b may be used for the sharing of data among different servers, such as the client computer systems 110a-110c. Each of the data storage arrays 120a-120b includes a storage subsystem 170 for data storage. Storage subsystem 170 may comprise a plurality of storage devices 176a-176m. Each of these storage devices 176a-176m may be a SSD. A controller 174 may comprise logic for handling received read/write requests. For example, the algorithms briefly described above may be executed in at least controller 174. A random-access memory (RAM) 172 may be used to batch operations, such as received read/write requests.

The base OS 132, a file system (not shown), an array manager 134, any OS drivers (not shown) and other software stored in memory medium 130 may provide functionality enabling access to files and LUNs, and the management of these functionalities. The software stored on memory medium 130 may comprise program instructions executable by processor 122. Some of these program instructions may perform one or more memory access operations in storage subsystem 170 that correspond to received requests. In one embodiment, the processor 122 also executes program instructions for the deduplication application 178.

Similar to processors within client computer systems 110a-110c, processor 122 may include circuitry for executing instructions according to a predefined instruction set. For example, the SPARC® instruction set architecture (ISA) may be selected. Alternatively, the x86, x86-64®, Alpha®, PowerPC®, MIPS®, PA-RISC®, or any other instruction set architecture may be selected. The processor 122 may utilize hardware design techniques such as superscalar, out-of-order execution and register renaming. Processor 122 may comprise a single core or multiple cores. In one embodiment, the processor 122 may be used in a single-processor configuration. In another embodiment, the processor 122 may be used in a multi-processor configuration.

Generally, processor 122 may access a cache memory subsystem for data and instructions. Each core of the one or more cores within processor 122 may contain its own level 1 (L1) and level 2 (L2) caches in order to reduce memory latency. These cache memories may be integrated within the respective one or more cores. Alternatively, these cache memories may be coupled to the respective one or more cores in a backside cache configuration or an inline configuration, as desired.

The L1 cache may be located nearer a respective core both physically and within the cache memory hierarchy. In one embodiment, logic, such as multiplexers or a switch fabric, allows any L2 cache to access any bank of an L3 cache, and conversely allows data to be returned from any L3 bank to any L2 cache. Additionally, in one embodiment, this logic may be configured to arbitrate conflicts that may occur when multiple L2 caches attempt to access a single bank of L3 cache, or vice versa.

In addition, the one or more cores within the processor 122 may be coupled to double data rate dual in-line memory modules (DDR DIMM) that reside on a circuit board outside processor 122. In one embodiment, DDR DIMM channel(s) may be on-chip in order to couple the one or more cores within the processor 122 to the DDR DIMM off-chip. Each available L3 cache may be coupled to a memory controller or a dynamic random access memory (DRAM) channel for communication to DRAM that resides off-chip. Also, an interface to a system bus may be coupled to each available L3 cache. The cache memory subsystem(s) may be used to store data corresponding to the above-described attributes and fingerprint tables. In addition, the RAM 172 and the memory medium 130 may be used to store this data.

Each of the data storage arrays 120a-120b may use a network interface 124 to connect to network 180. Similar to client computer systems 110a-110c, in one embodiment, the functionality of network interface 124 may be included on a network adapter card. The functionality of network interface 124 may be implemented using both hardware and software. Both a random-access memory (RAM) and a read-only memory (ROM) may be included on a network card implementation of network interface 124. One or more application specific integrated circuits (ASICs) may be used to provide the functionality of network interface 124.

In the network architecture 100, each of the data storage arrays 120a-120b may be used for the sharing of data among different servers and computers, such as client computer systems 110a-110c. In addition, the data storage arrays 120a-120b may be used for disk mirroring, backup and restore, archival and retrieval of archived data, and data migration from one storage device to another. In an alternate embodiment, one or more client computer systems 110a-110c may be linked to one another through fast local area networks (LANs) in order to form a cluster. Such clients may share a storage resource, such as a cluster shared volume residing within one of data storage arrays 120a-120b.

Each of the data storage arrays 120a-120b includes a storage subsystem 170 for data storage. Storage subsystem 170 may comprise a plurality of storage devices 176a-176m. These storage devices 176a-176m may provide data storage services to client computer systems 110a-110c. Each of the storage devices 176a-176m uses a particular technology and mechanism for performing data storage. The type of technology and mechanism used within each of the storage devices 176a-176m may at least in part be used to determine the algorithms used for controlling and scheduling read and write operations to and from each of the storage devices 176a-176m. The logic used in these algorithms may be included in one or more of a base operating system (OS) 132, a file system, one or more deduplication applications 178 within a storage subsystem controller 174, control logic within each of the storage devices 176a-176m, or otherwise. Additionally, the logic, algorithms, and control mechanisms described herein may comprise hardware and/or software.

Each of the storage devices 176a-176m may be configured to receive read and write requests and comprise a plurality of data storage locations, each data storage location being addressable as rows and columns in an array. In one embodiment, the data storage locations within the storage devices 176a-176m may be arranged into logical, redundant storage containers or RAID arrays (redundant arrays of inexpensive/independent disks). In some embodiments, each of the storage devices 176a-176m may utilize technology for data storage that is different from a conventional hard disk drive (HDD). For example, one or more of the storage devices 176a-176m may include or be further coupled to storage consisting of solid-state memory to store persistent data. In other embodiments, one or more of the storage devices 176a-176m may include or be further coupled to storage using other technologies such as spin torque transfer technique, magnetoresistive random access memory (MRAM) technique, shingled disks, memristors, phase change memory, or other storage technologies. These different storage techniques and technologies may lead to differing I/O characteristics between storage devices.

In one embodiment, the included solid-state memory comprises solid-state drive (SSD) technology. Typically, SSD technology utilizes Flash memory cells. As is well known in the art, a Flash memory cell holds a binary value based on a range of electrons trapped and stored in a floating gate. A fully erased Flash memory cell stores no or a minimal number of electrons in the floating gate. A particular binary value, such as binary 1 for single-level cell (SLC) Flash, is associated with an erased Flash memory cell. A multi-level cell (MLC) Flash has a binary value 11 associated with an erased Flash memory cell. After applying a voltage higher than a given threshold voltage to a controlling gate within a Flash memory cell, the Flash memory cell traps a given range of electrons in the floating gate. Accordingly, another particular binary value, such as binary 0 for SLC Flash, is associated with the programmed (written) Flash memory cell. A MLC Flash cell may have one of multiple binary values associated with the programmed memory cell depending on the voltage applied to the control gate.

The differences in technology and mechanisms between HDD technology and SDD technology may lead to differences in input/output (I/O) characteristics of the data storage devices 176a-176m. Generally speaking, SSD technologies provide lower read access latency times than HDD technologies. However, the write performance of SSDs is generally slower than the read performance and may be significantly impacted by the availability of free, programmable blocks within the SSD. As the write performance of SSDs is significantly slower compared to the read performance of SSDs, problems may occur with certain functions or operations expecting latencies similar to reads. Additionally, scheduling may be made more difficult by long write latencies that affect read latencies. Accordingly, different algorithms may be used for I/O scheduling in each of the data storage arrays 120a-120b.

Typically, a Flash cell within an SSD is erased before it is written with new data. An erase operation is also performed prior to a write or program operation for a Flash memory cell. An erase operation may also be performed on a block-wise basis. All of the Flash memory cells within a block (e.g., an erase segment) are erased together. A block is relatively large and comprises multiple pages. In one example, a page is 4 kilobytes (KB) and a block comprises 64 pages, or 256 KB. Erase operations generally have a relatively high latency.

In addition to the above, Flash cells experience wear after repeated erase-and-program operations. The wear in this case is due to electric charges that are injected and trapped in the dielectric oxide layer between the substrate and the floating gate of the MLC Flash cell. In one example, an MLC Flash cell may have a limit on the number of times it can be reliably erased and programmed, such as a range from 10,000 to 100,000 erase-program cycles. In addition, SSDs may also experience program disturb errors where a neighboring or nearby Flash cell experiences an state change while another Flash cell is being erased or programmed. Further, SSDs may experience or exhibit read disturb errors, wherein the accidental state change of a nearby Flash cell occurs when another Flash cell is being read.

Knowing the characteristics of each of the one or more storage devices 176a-176m may lead to more efficient data object mapping, error detection and correction, and storage efficiency. As is well known in the art, deduplication may reduce the amount of redundant data stored in the device groups 173a-173m. When an application being executed on one of the client computer systems 110a-110c performs a store of a file, this file may be transferred to one of the data storage arrays 120a-120b through network 180. The deduplication application 178 may determine whether data components of the file are redundant. Data components of the file verified to be redundant are not stored. Rather, metadata may be stored which references a copy of a data component already residing in one of the device groups 173a-173m. If it cannot be verified that a given data component is redundant, the given data component will be stored.

The identification of duplicate data components during deduplication may occur "in-line" or "inline", as a write request is being processed. In such a case, verified duplicate data components are not actually written to storage for a write request. During verification, data corresponding to a write request may be partitioned into blocks, or components. A fingerprint computation is then performed for each component. As discussed later, any of several techniques for generating fingerprints that are well known may be used. A corresponding fingerprint value, or fingerprint, of data associated with a write access to one of the data storage arrays 120a-120b may then be compared to fingerprints of data already stored in a storage subsystem 170. The comparisons of fingerprints may utilize one or more tables of fingerprints, such as in RAM 172 or otherwise. In various embodiments, data components whose fingerprint matches that of a stored data component may be deemed to be redundant. In some embodiments, a matching fingerprint may not be considered conclusive evidence that a data component is in fact identical to a stored data component. In such embodiments, a further verification may be performed whereby the data component is compared with the stored data component to verify that the components are indeed identical. Verified duplicate data components may be made to reference a corresponding copy already stored in one of the data storage arrays 120a-120b. Alternatively, the process of deduplication may be performed as a "post-process" after the write request has completed. While such a post-process deduplication may require fewer up front resources, storage efficiency may be temporarily reduced because duplicate data components are written to one or more of the data storage arrays 120a-120b.

The deduplication application 178 may be located within the storage controller 174 or within memory medium 130. In one embodiment, the deduplication application 178 may detect for any given data component one or more corresponding maintained attributes. In various embodiments, deduplication component 178 may comprise any suitable combination of software and/or hardware. These maintained attributes may affect storage efficiency. Examples of these corresponding attributes may include a number of accesses to the given data component, a data component age, a data component size, a total number of times the given data component has been deduplicated, a number of times the given data component has been deduplicated for a given entry in a deduplication table, a total number of deduplications for a corresponding volume, and so forth. In one embodiment, the attributes may be used to determine which entry of two or more entries corresponding to duplicate copies of data remains after deduplication.

The deduplication application 178 may utilize such attributes to determine a strategy for the deduplication of redundant data stored on data storage arrays 120a-120b. The strategy may utilize both in-line and post-process deduplication operations. For example, the deduplication application 178 may begin with in-line deduplication for a given write request, but not finish the deduplication operation at this time. Rather, the in-line deduplication operation may attempt to verify whether or not a given data component has a duplicate copy currently stored based on only partial information. If no duplicate copy of the given data component is found, then the in-line deduplication operation may complete without locating a duplicate of the component already stored in the system. In such a scenario, the given data component may be written to storage. At a later time, an offline or post-process deduplication operation may be performed that completes the deduplication process by performing additional searches to search for and locate duplicates of the given component among the stored data components.

In addition to the above, the attributes may be used to identify a particular group of stored data components—such as a percentage (e.g., 5%) of the total number of stored data components that have the highest probability of being deduplicated (or meet some other criteria as discussed more fully below). If a given write request has a corresponding data component that is not included in this group, then an increased effort to find duplicate copies may be deferred to a later time. In addition, the members of this portion of the stored data components may change over time according to the maintained attributes.

In various embodiments, the deduplication application 178 may support multiple index tables. These index tables may also be referred to as lookup tables or deduplication tables. For a particular data component, a corresponding entry in an index table may store at least one or more of an associated calculated fingerprint value, an identifier (e.g., a pointer) used to identify its location on one of the storage devices 176a-176m, and a corresponding length. Each of the multiple index tables may be implemented as a data structure such as a binary search tree, or an ordered binary tree, comprising a node-based data structure. The properties of this data structure may cause related sorting algorithms and search algorithms such as in-order traversal to be very efficient.

In some cases, a complete index table may be very large and may exceed the memory capacity of RAM 172. Accordingly, in various embodiments one or more index tables are configured to store data corresponding to only a fraction of all data within the system. For example, a first index table stored within RAM 172 may represent a subset of all data stored in the system. In various embodiments, the maintained attributes may be used to determine which stored data components have corresponding entries in the first index table. In some cases a second index table may correspond to a larger subset of the data in the system. In such cases, some or all of the entries in the first table could be included in the second table, or they could be mutually exclusive. Further inclusive or exclusive tables could be included in such a system. Entries may be removed from one table and inserted in another table based on the maintained attributes, or such entries could be moved such that one table acts similar to a victim cache for another. The movement of the entries may occur during given events such as a deduplication operation, a garbage collection operation, a trim operation, a secure erase operation, a read request that does not initiate a deduplication operation, reaching a given time threshold, reaching a certain table size, and so forth. In addition to the above, embodiments are contemplated in which inline and offline searches are flexibly applied. For example, an inline search for one data component may search only a single index table, while an inline search for another data component may search multiple index tables. Offline searches could be similarly applied in a flexible manner. How such a search is applied could be based on attributes corresponding to the data component (e.g., probabilities associated with the data component, the type of data or request, etc.) or otherwise.

Each of the multiple index tables may also be referred to as a "fingerprint table". Different fingerprint tables may be used at different times to attempt to identify stored data components for which a newly-written component is a duplicate. Fingerprints may be placed into one or more tables, based on one or more attributes. Additionally, fingerprints may move between different tables responsive to varying conditions. For example, one fingerprint table might contain the 5% of fingerprints corresponding to stored data components most likely to be deduplicated, with another fingerprint table containing the next 10% (but not the top 5%). A third fingerprint table may contain the remaining fingerprints. In such an embodiment, the fingerprint tables store fingerprints in an exclusive manner. In other embodiments, one or more fingerprint tables may be inclusive of fingerprints in one or more other tables. In another example, the LUNs may be divided into sets based on their usage patterns, with one set being used for virtual machine storage and another set being used for database storage. One fingerprint table may then be used for a subset of data stored in the first set, a second table may be used for a subset of data stored in the second set, and a third fingerprint table may contain all of the fingerprints corresponding to stored data components. Numerous such alternatives, and combinations of the above, are possible and are contemplated.

Figure 2:
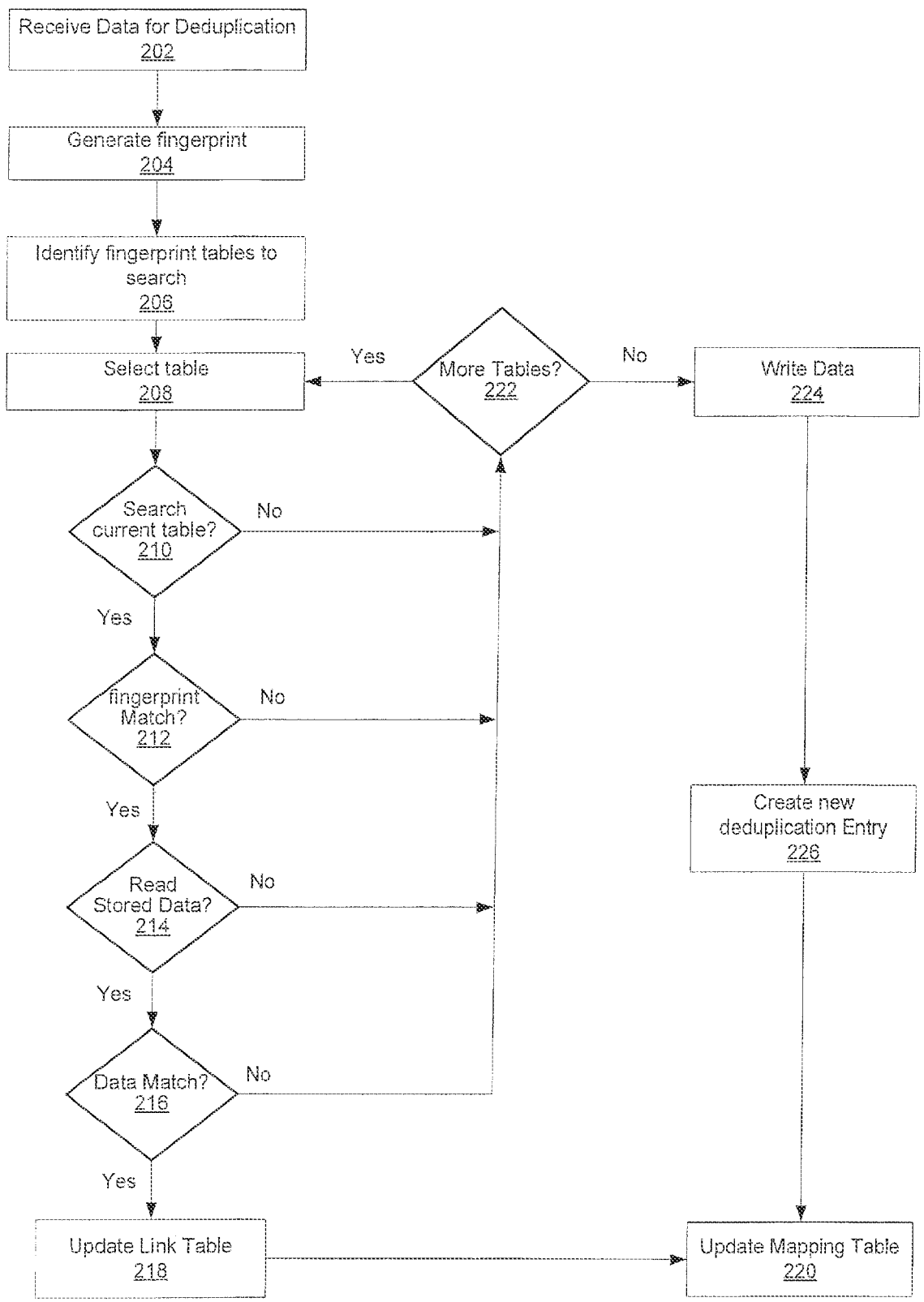
FIG. 2 illustrates one embodiment of a method for performing deduplication.

Referring now to FIG. 2, one embodiment of a method 200 for performing deduplication is shown. The components embodied in the network architecture 100 described above may generally operate in accordance with method 200. For purposes of discussion, the steps in this embodiment are shown in sequential order. However, some steps may occur in a different order than shown, some steps may be performed concurrently, some steps may be combined with other steps, and some steps may be absent in another embodiment.

In block 202, one or more given data components for an operation are received. Such data components may correspond to a received write request, a garbage collection operation, or otherwise. In various embodiments, data sent from one of the client computer systems 110*a*-110*c* may be in the form of a data stream, such as a byte stream. As is well known to those skilled in the art, a data stream may be divided into a sequence of fixed-length or variable-length data components, or "chunks", where a "chunk" is a sub-file content-addressable unit of data. A chunking algorithm may perform the dividing of the data stream. In various embodiments, a table may be used to map data corresponding to particular file types to a most appropriate chunking method. In some cases a file's type may be determined by referring to its file name extension. Alternatively, in cases where a file type corresponding to data is not indicated or otherwise directly known, guesses as to the type of file to which data corresponds may be made and used to inform the chunking algorithm used. For example, a guess as to file type could be based on the data in the block or the LUN in which the block is stored. Other methods for ascertaining a file type to which data corresponds are possible and are contemplated. The chunks later may be stored in one of the data storage arrays 120*a*-120*b* to allow for sharing of the chunks. Numerous such embodiments are possible and are contemplated.

Subsequent to receiving the data, a particular fingerprint algorithm 204 may be chosen to produce a data component fingerprint value for a given data component. For example, a hash function, such as some or all of the output bits from MD5, SHA1, SHA-256, cyclic-redundancy code (CRC), or otherwise, may be used to calculate a corresponding fingerprint. Generally speaking, in order to know if a given data component corresponding to a received write request may already be stored in one of the data storage arrays 120*a*-120*b*, a calculated fingerprint for the given data component may be compared to fingerprints of data components stored in one or more of the data storage arrays 120*a*-120*b*. If there is no matching fingerprint, there is no copy of the data component already stored on the system. If at least one fingerprint matches, then there may already be a matching data component stored on the system. However, in some embodiments, it is also possible that two non-identical data components have the same fingerprint. Using the generated fingerprint value for a data component, a search may be performed to determine if there is another data component already present in the system that has a matching fingerprint value. In various embodiments, such fingerprint values may be stored in one or more fingerprint tables within the system. Accordingly, a determination as to which of the fingerprint tables to search may be made (block 206).

Having established which fingerprint tables are to be searched, one of the tables is selected (block 208) and a decision is made as to whether the selected table is searched (decision block 210). A number of factors may be considered when deciding whether to search a given table. For example, resource usage and performance issues may be considered. If the table is searched, then a matching fingerprint may be found (decision block 212). In various embodiments, if a matching fingerprint is found, then the corresponding data already stored in the system may be identical to the received data. However, the matching fingerprint may not be definitive proof that the data itself matches. Such might be the case where fingerprints collide or otherwise. Therefore, if a matching fingerprint is found, then a determination may be made as to whether further verification steps are to be performed. Generally speaking, verifying that data is a match entails reading the stored data (decision block 214) and comparing the read data to the received data (decision block 216). If the stored data is already contained in memory, there is generally no need to re-read it from its stored location. If the data matches, then the received data is deemed redundant and a new link is created between the already existing data (e.g., as identified by a physical address) and the transaction corresponding to the received data. For example, a new link may be created between a write transaction virtual address and the already stored data. In one embodiment, both a mapping table and a link table (to be discussed more fully later) may be used for storing such newly identified links.

At various steps in the process (e.g., blocks 210, 212, 214, and 216), verification of a data match has not been achieved and a determination is made as to whether the search should continue. As noted above, resource and/or performance issues may be considered when making such a determination. If more tables are to be searched (decision block 222), then one of the tables may be selected (block 208), and the process repeated. If verification of a data match is not achieved at this time (as in blocks 216 and 218), then confirmation that the data is redundant is not made and the received data is written to storage (block 224). Additionally, a new deduplication entry may be created (block 226) as well as updating other tables (block 220) such as an address mapping table (220) or otherwise.

It is noted that while the above discussion describes a process whereby tables to search are determined (block 206) prior to proceeding, in other embodiments an identification of more than one table may not be made in advance. Rather, identification of a given table for search may be determined one at a time (or only partially) as needed. Alternatively, a combination of such approaches may be used. All such embodiments are contemplated.

In addition to the general method depicted in FIG. 2, additional processes may be included which serve to improve the overall deduplication process. In particular, various attributes may be maintained which are used to identify which fingerprint tables might be searched and whether to search a given identified table. Further, other attributes may be maintained that are used to determine into which fingerprint table(s) a given fingerprint is stored. For example, as will be described in more detail below, fingerprints whose data is expected to be deduplicated more frequently may be maintained in a fingerprint table which has a higher priority for being searched. Alternatively, fingerprints corresponding to data of a given type may be placed in one fingerprint table rather than another. By storing fingerprints within the fingerprint tables in such a manner, system performance and resource usage may be improved.

It is noted that in various embodiments the access to fingerprint tables shown in FIG. 2 may not be performed, such as when a Bloom filter or other mechanism indicates the fingerprint is not present in the fingerprint tables. Additionally, in some embodiments, an address to which a write transaction is directed may correspond to an address range which has known attributes. For example, a received write transaction could be directed to a particular volume which is known to store data unlikely to be deduplicated. For example, data corresponding to a given database may be deemed less likely to be deduplicated, while data corresponding to a virtual machine may be deemed more likely to be deduplicated. For example, a fingerprint table corresponding to a volume including data believed to be more likely to be deduplicated may be larger than would otherwise be the case. In various embodiments, a volume table may include attribute related information that may be used in such a way. In other embodiments, other tables may be used for storing and maintaining such attribute related information. In addition to controlling the selection of fingerprint tables to be searched, limits on the number of accesses to a given storage medium may be made. In addition to utilizing various attributes to limit the fingerprint table search, various conditions such conditions as those related to resource usage and performance may be considered when limiting the fingerprint table search.

In one embodiment, a deduplication table may be partitioned or otherwise comprise multiple fingerprint tables. Each entry within a given table has an associated probability or a range of probabilities of a corresponding data component being deduplicated. In one example, for a received write request, an in-line deduplication operation may access a first fingerprint table with computed fingerprint values corresponding to one or more data components. If the computed fingerprint values are not found within the first fingerprint table, then the in-line deduplication operation may stop and allow a data component to be written to one of the storage devices 176a-176m. In another example, according to a strategy based on the associated attributes, if the computed fingerprint values are not found in the first fingerprint table, then a subsequent access of a second fingerprint table may occur. If the computed fingerprint values are not found in the second fingerprint table, then the in-line deduplication operation may finish for a given data component and allow the given data component to be written to one of the storage devices 176a-176m. In one embodiment, both the first and the second fingerprint tables may be concurrently accessed. Data components written to the storage devices 176a-176m may be deduplicated during a later post-process deduplication operation. In one embodiment, although a post-process deduplication operation may be performed concurrently with a garbage collection operation, the accesses for the post-process deduplication operation may occur similarly as for an in-line deduplication operation. For example, the first fingerprint table may be accessed before a second fingerprint table. In another embodiment, the entries of the fingerprint tables may be accessed concurrently.

Figure 3:
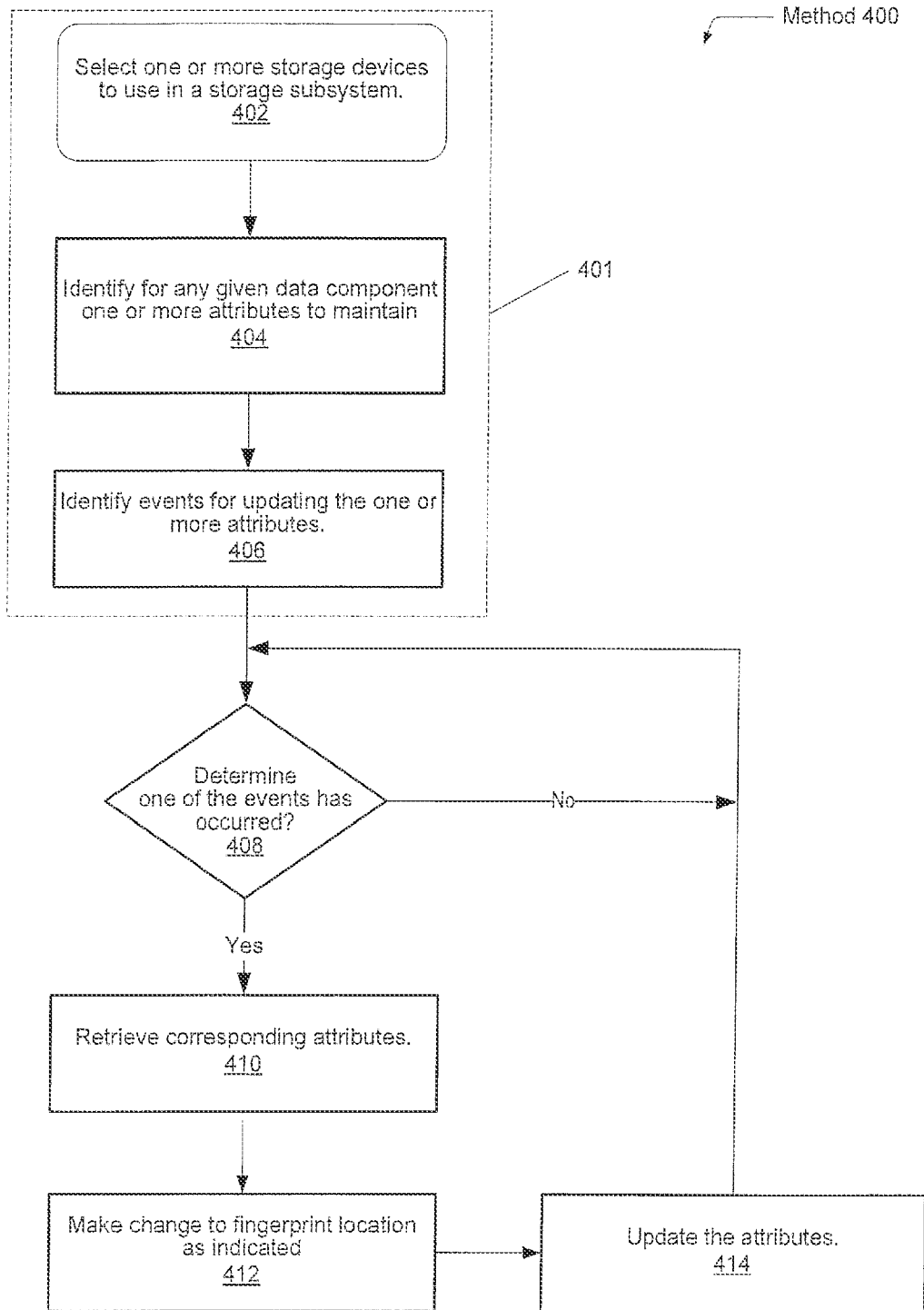
FIG. 3 illustrates one embodiment of a method for maintaining fingerprints in a deduplication table.

As noted above, in various embodiments, attributes may be used to determine where a fingerprint value is stored within multiple fingerprint tables of a larger deduplication table. FIG. 3 illustrates one embodiment of a method 400 for using such attributes. Block 401 generally corresponds to the establishment of a strategy to be used for the following steps. This strategy may be determined at system startup and/or dynamically at any time during system operation. In some cases, a change in strategy may result in a change in the nature of the attributes which are maintained. Should such a change in strategy occur, the system may simultaneously maintain data and attributes corresponding to multiple strategies. For example, a change in strategy may affect only subsequently stored data. In other embodiments, data and attributes maintained according to a prior strategy may be rebuilt to conform to a newer strategy. All such embodiments are contemplated. In block 402, one or more storage devices may be selected for use in a storage subsystem. For example, one or more storage devices 176a-176m within one or more of device groups 173-173m may be chosen for data storage use. In addition, more than one of the storage data arrays 120a-120b may be chosen for this data storage use. An amount of storage space and corresponding address space may be chosen prior to choosing one or more of the storage devices 176a-176m. The data storage space may be used for end-user applications executing on client computer systems 110a-110c, corresponding inter-device parity information used in a RAID architecture, corresponding intra-device redundancy information, header and metadata information, and so forth.

In block 404, one or more corresponding attributes are identified for a given data component. Examples of such attributes include a number of accesses to the given data component, a data component age, a data component size, a total number of times the given data component has been deduplicated, a number of times the given data component has been deduplicated for a given entry in a deduplication table, an amount and/or type of compression used for the data component, and so forth. In various embodiments, these attributes may be maintained and updated over time. For example, the attributes for a given data component may be updated responsive to an access of the given data component. In some embodiments, the granularity with which such attributes are maintained and/or updated may vary. For example, rather than updating attributes on a per data component basis, attributes corresponding to an identifiable group of data components such as a volume or subvolume may be updated. As described earlier, these maintained attributes may affect storage efficiency.

In block 406, one or more events for updating the one or more attributes are identified. Examples of such events may include a deduplication operation, receiving a read or a write request, a garbage collection operation, a trimming operation, a secure erase operation, an update of attributes corresponding to neighboring data components, reaching a given time threshold, and so forth. If a given event of the identified events occurs (decision block 408), one or more attributes corresponding to the given event may be retrieved (block 410). For example, deduplication of a data component may be detected. In response, attributes associated with the data component may be retrieved (block 410). If the current algorithm indicates a change in location for a fingerprint, then such a change may be made (block 412). For example, if a successful deduplication of a data component results in the number of successful deduplications for that block reaching or exceeding a given threshold, then the block may move from being deemed a low(er) deduplicating block to a high(er) deduplicating block. Such a change may in turn lead to entering the fingerprint into a table with a higher deemed probability of deduplication, and potentially removing the fingerprint from the table in which it is currently stored. This may be referred to as "promoting" the fingerprint (entry). Alternatively, an entry corresponding to a block may be "demoted" if deduplication of the block falls below a given threshold. In such a case, a corresponding fingerprint may be removed from its current table and entered into one which is used for fingerprints having a lower (predicted) probability of deduplication. For example, if a given fingerprint table contains the 5% of the total number of stored data components that have the highest probability of being deduplicated, and it is determined (or predicted) that the likelihood of the data corresponding to the entry being deduplicated is not in the top 5%, then the entry may be moved out its current fingerprint table to a different fingerprint table. In addition to making any changes (block 412), the associated attributes may be updated (block 414). It is noted that movement of entries between fingerprint tables need not be based on determined probabilities of deduplication. Any desired algorithm for determining which fingerprint table an entry is to be stored may be used.

In addition to moving fingerprints between tables, information stored in a given entry may be removed from all fingerprint tables within a deduplication table. This eviction of an entry may occur if the entry is determined from its associated attributes to not be a probable candidate for deduplication or if the block to which the entry refers is no longer valid. For example, an entry that has not been deduplicated for a given amount of time may be evicted from the deduplication table. This eviction reduces the total size of the deduplication table by removing entries corresponding to a data component that have a relatively low probability of having a duplicate stored in one of the data storage arrays 120a-120b. It is noted that an entry may be removed from the deduplication table even if that entry is the target of multiple virtual block pointers, since such removal may only preclude future deduplications and will not affect deduplications that have already occurred.

In one embodiment, when an entry is evicted from the deduplication table, an indication of the eviction may be written to a corresponding physical location within one of the data storage arrays 120a-120b. For example, a physical location within one of the storage devices 176a-176m that currently stores or is going to store a corresponding data component may be written with the indication. In one embodiment, both the eviction from the deduplication table and the marking with a corresponding indication in a data physical storage location may occur during a write request, a garbage collection operation, a trim operation, a secure erase operation, and so forth. In such cases, both the entries in the fingerprint tables and the data components stored within the storage devices 176a-176m may be already moving or updating during these operations. Therefore, the marking of the indication may not introduce a new write operation.

Figure 4:
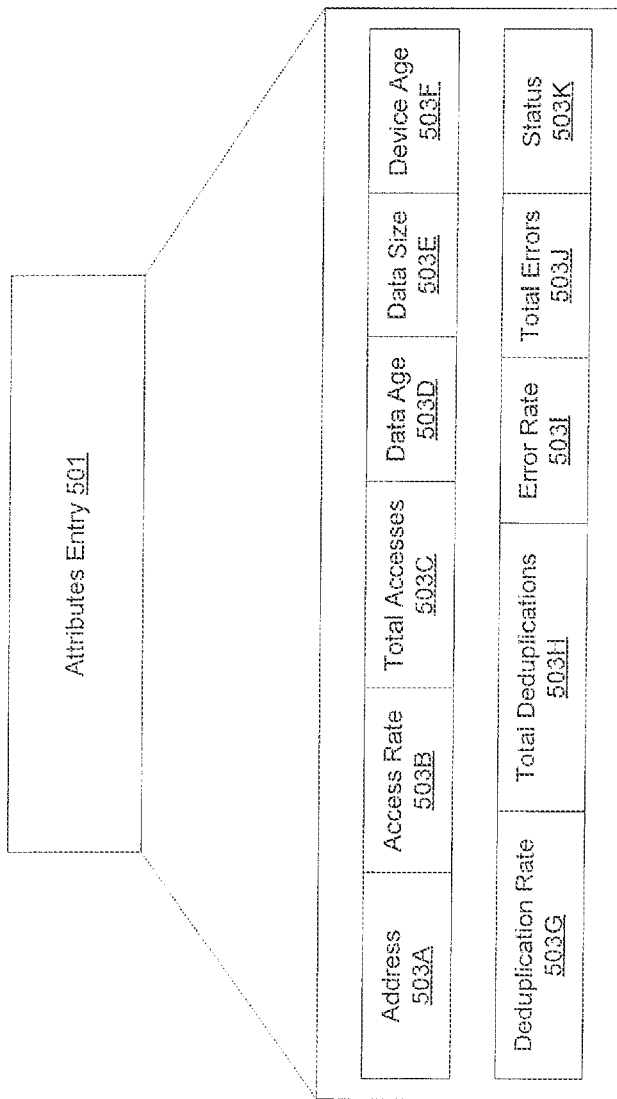
FIG. 4 is a generalized block diagram illustrating one embodiment of a table entry storing attributes.

Turning now to FIG. 4, a generalized block diagram illustrating one embodiment of an entry storing attributes 500 is shown. It is noted that while FIG. 4 depicts all of the attribute data as being stored as part of a single entry, in various embodiments the attribute data may in fact be distributed over multiple locations. In various embodiments, attributes associated with a given block of data and/or corresponding fingerprint may be used for a variety of purposes, including where a corresponding fingerprint(s) is to be stored in the deduplication tables. For example, as discussed above, if a given data component is determined or predicted to be highly deduplicated, its fingerprint may be stored in a fingerprint table used for more highly deduplicated data. Similarly, data deemed less likely to be deduplicated has its fingerprint stored in a lower probability fingerprint table. It is noted that attributes associated with a given fingerprint may be stored anywhere within the system. For example, such attributes may be stored in association with corresponding data on a LUN. Additionally, such attributes may be stored in deduplication tables, copies may be maintained in a variety of locations in the system, and otherwise.

As shown in the example, entry 501 may hold an address 503A which may be a virtual address or a physical address. In various embodiments, address 503A may refer to a single address, or it may refer to a range of addresses. The entry 501 may be accessed by a pointer value that matches the information stored in the address field 503A. The information stored in the remaining fields may correspond to a given data component corresponding to a physical location in the storage devices 176a-176m or a virtual address used by one of the client computer systems 110a-100c. For a given physical or virtual address the table entry 501 may store an access rate 503B, a total number of accesses 503C, a data component age 503D, a data component size 503E, a corresponding storage device age 503F, a deduplication rate 503G, a total number of deduplications 503H, an error rate 503I and a total number of errors 503J for the given component. In addition, a status field 503K may store an indication of valid data within a respective entry. For a given physical or virtual address, other attributes may be included such as a total number of deduplications for an associated volume and a total number of accesses for an associated volume. Although the fields 503-512 are shown in this particular order, other combinations are possible and other or additional fields may be utilized as well. The bits storing information for the fields 503-512 may or may not be contiguous.

Figure 5:
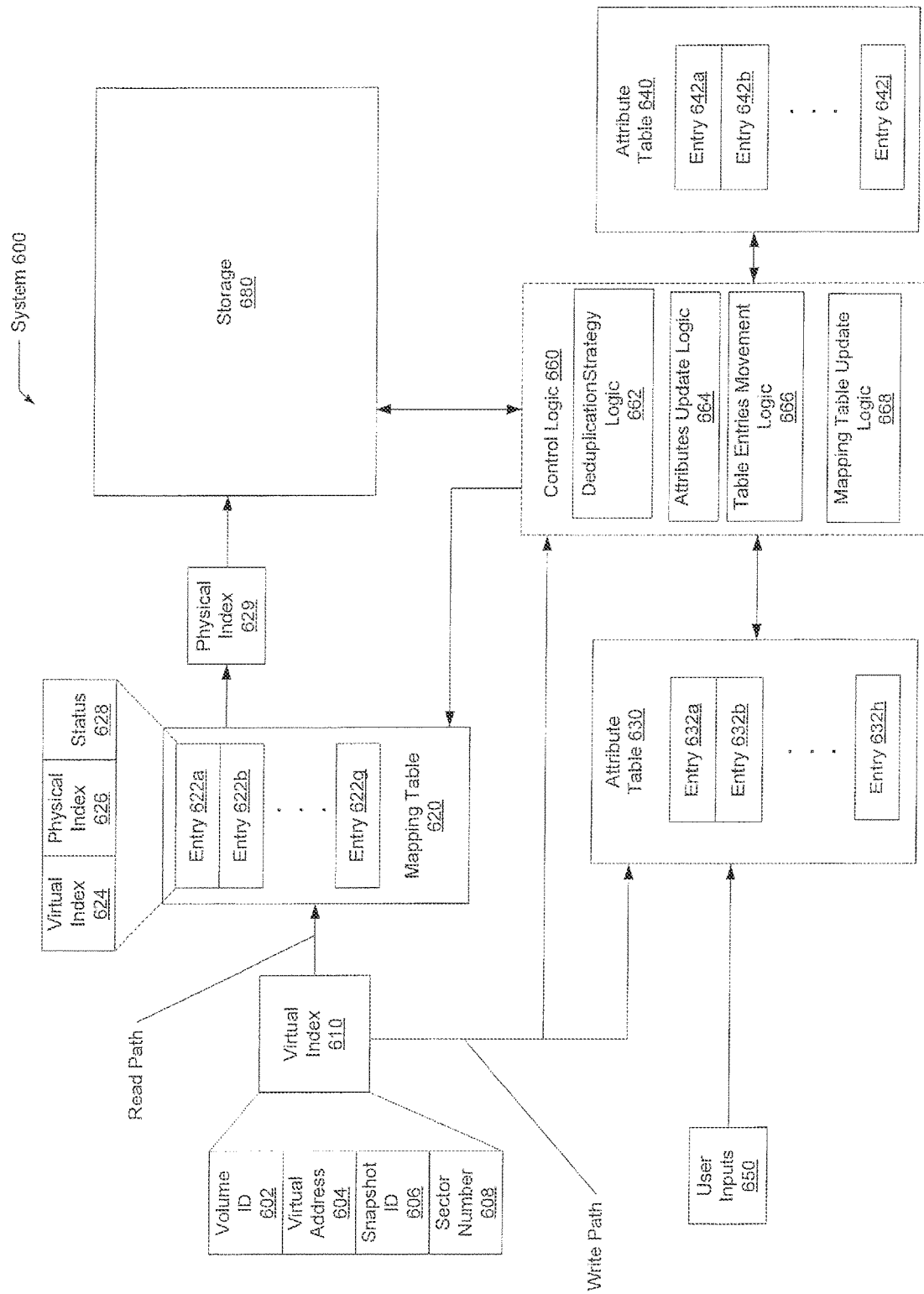
FIG. 5 is a generalized block diagram illustrating one embodiment of a system for maintaining attributes tables for data components.

Referring now to FIG. 5, a block diagram illustrating one embodiment of a system 600 configured to maintain attributes related to deduplication is shown. In one embodiment, an attribute table 630 may store attribute information that is used to determine how much effort is put into deduplication for a received write transaction (e.g., such as discussed in relation to FIGS. 2 and 3). Attribute table 640 may store attribute information that is used to determine where a given fingerprint is stored within the system's fingerprint tables (e.g., as discussed in FIG. 3). For example, each of the entries 642a-642j in table 640 may comprise the information shown in attributes table entry 501. In the example shown, attribute tables 630 and 640 are shown as two distinct tables for ease of illustration. However, it is noted that the attributes described therein may be stored in any manner within the system and may be spread across multiple locations. In various embodiments, copies of such attributes may also be cached or otherwise stored in different levels within a storage hierarchy such that multiple copies of attribute information may exists simultaneously.

In the embodiment shown, two paths (a read path and a write path) through various components of the system may generally be traversed depending on the type of transaction received. In the example shown, a key 610 corresponding to a received transaction may be used for further processing in the system. In one embodiment, the key 610 may comprise a volume identifier (ID) 602, a logical or virtual address 604, a snapshot ID 606, a sector number 608, and so forth. In various embodiment, each of the previously discussed storage controllers 170 within the data storage arrays 120a-120b may support storage array functions such as snapshots, replication and high availability. In addition, each of the storage controllers 170 may support a virtual machine environment that includes a plurality of volumes with each volume including a plurality of snapshots. In one example, a storage controller 170 may support hundreds or thousands of volumes, wherein each volume includes thousands of snapshots. In one embodiment, a volume may be mapped in fixed-size sectors, such as a 4-kilobyte (KB) page within storage devices 176a-176m. In another embodiment, a volume may be mapped in variable-size sectors. In such embodiments, the volume ID 602, snapshot ID 606, and sector number 608 may be used to identify a given volume. Accordingly, a given received read or write request may identify a particular volume, sector and length. Although the fields 602-608 are shown in this particular order, other combinations are possible and other or additional fields may be utilized as well. The bits storing information for the fields 602-608 may or may not be contiguous.

In one embodiment, the key 610 corresponding to a read transaction may generally follow a read path, while a key 610 that is part of a write transaction may follow a write path. As shown, during a read, the key 610 may be used to index a mapping table 620. The mapping table 620 may comprise a plurality of entries 622a-622g, wherein each entry holds a virtual-to-physical mapping for a corresponding data component. In this manner, the mapping table 620 may be used to map logical read requests from each of the client computer systems 110a-110c to physical locations in storage devices 176a-176m. It is noted that in various embodiments, identified physical locations (e.g., represented by a physical address) may be further remapped by storage 680. As shown, each of the entries 622a-622g may hold a virtual index 624, a corresponding physical index 626, and status information 628. Similar to the fields 602-608 within the key 610, the fields 624-628 are shown in a particular order. However, other combinations are possible and other or additional fields may be utilized as well. The physical index 626 may generally be an identifier (e.g., a physical pointer or address) used to identify a given physical location within the storage devices 176a-176m. As described earlier, the physical index 626 may include sector numbers, data chunk and offset numbers, track numbers, plane numbers, a segment identifier (ID), and so forth. In addition, the status information 628 may include a valid bit which may be used to indicate the validity of a corresponding mapping.

In one embodiment, the entries 622a-622g within the mapping table 620 may be sorted such that the sorting is done first by the volume ID 602, then by the sector number 608, and then by the snapshot ID 606. This sorting may serve to group the entries 622a-622g corresponding to different versions of data components within different snapshots together. Such an arrangement may lead to fewer read operations to find a given data component during a lookup operation for a read request. During a garbage collection operation, the operation may arrange the data components within the storage devices 176a-176m in a sorted manner, wherein the sorting is done first by the volume ID 602, then by the snapshot ID 606, and then by the sector number 608. This may serve to group the data components in storage devices 176a-176m that are logically adjacent into physically adjacent locations.

In one embodiment, a physical index 629 may be read from the mapping table 620 during a lookup operation corresponding to a received read request. The physical index 629 may then be used to locate a physical location within the storage devices 176a-176m. In some cases, a read request may include a length that spans multiple sectors. Therefore, there may be multiple parallel lookups performed on the mapping table 620. In addition, there may be multiple read operations sent to the storage devices 176a-176m to complete a received read request from one of the client computer systems 110a-110c.

In addition to the above, the key 610 may correspond to a received write request and may follow a write path as shown. In the example shown, the key 610 may be conveyed to either (or both) of attribute table 630 and control logic 660. In one embodiment, attribute table 630 stores attribute information regarding the storage environment and/or data stored within the system. In some embodiments, attribute table 630 may correspond to a volume table. The attribute table 630 may comprise a plurality of entries 632a-632h, wherein each entry holds attributes associated with a virtual address, addresses, or range of addresses. Generally speaking, attributes may be maintained for a subset of addresses in the system. However, maintaining attributes for all addresses is contemplated.

When a write request is received, control logic 660 may receive or otherwise access associated attributes from the table 630. In addition, control logic 660 may receive user inputs 650. Received write requests may be placed in a buffer upon receipt, such as a buffer within a non-volatile random access memory (NVRAM). When the received write request is buffered, an acknowledgment may be sent to the corresponding one of the client computer systems 110a-110c. At a later time, an asynchronous process may flush the buffered write operations to the storage devices 176a-176m. However, deduplication may occur both prior to sending write requests from the DRAM to the NVRAM and prior to sending write requests from the NVRAM to the storage devices 176a-176m. In cases where inline deduplication detects a copy of the received write data already exists in the system, the received write data may be discarded.

The user inputs 650 may include identification of particular application and corresponding volumes that may have a high probability of deduplication during the execution of the identified particular applications. The identified applications may include storage backup operations, given virtual machine support applications, development software producing a particular type of development data, and so forth. The user inputs 650 may include identification of a range or a pattern of virtual addresses used to identify corresponding data components with an associated virtual index that satisfies the range or pattern with respect to a virtual index of a current read/write request. For example, a given data component may have a high probability of deduplication if the given data component is located near a data component that is currently being deduplicated. A stride may be used to identify corresponding virtual data component indexes. In addition, the user inputs 650 may include administrative settings.

Control logic 660 may comprise deduplication strategy logic 662, attributes update logic 664, table entries movement logic 666, and mapping table update logic 668 which is configured to update mapping table 620 (e.g., as described in step 220 of FIG. 2). The deduplication strategy logic 662 may determine, for a search of a deduplication table, a number of lookup operations to use for a search for both an inline and a post-process deduplication operation. In addition, the deduplication strategy logic 662 may determine a number of lookup operations to use for each given storage medium used to store information corresponding to the deduplication table. Further details are provided later.

The attributes update logic 664 within the control logic 660 may determine which entries in the tables 630 and 640 may be updated during an identified event, such as the events listed above corresponding to block 414 of method 400. The table entries movement logic 666 may determine how entries within a deduplication table (e.g., fingerprint tables corresponding to the deduplication table) are stored and moved within the table. In addition, the logic 666 may determine a manner for storage and movement of stored data in physical locations in storage devices 176a-176m. Similarly, the logic 666 may determine how virtual-to-physical mappings are performed. For example, the logic 666 may perform mappings to group together deduplicated data components. It is noted that while FIG. 5 (and other figures) depicts selected arrows as being bidirectional and others as unidirectional, this is not intended to be limiting. In various embodiments, communication may occur in either or both directions between any of the components in the system.

Figure 6:
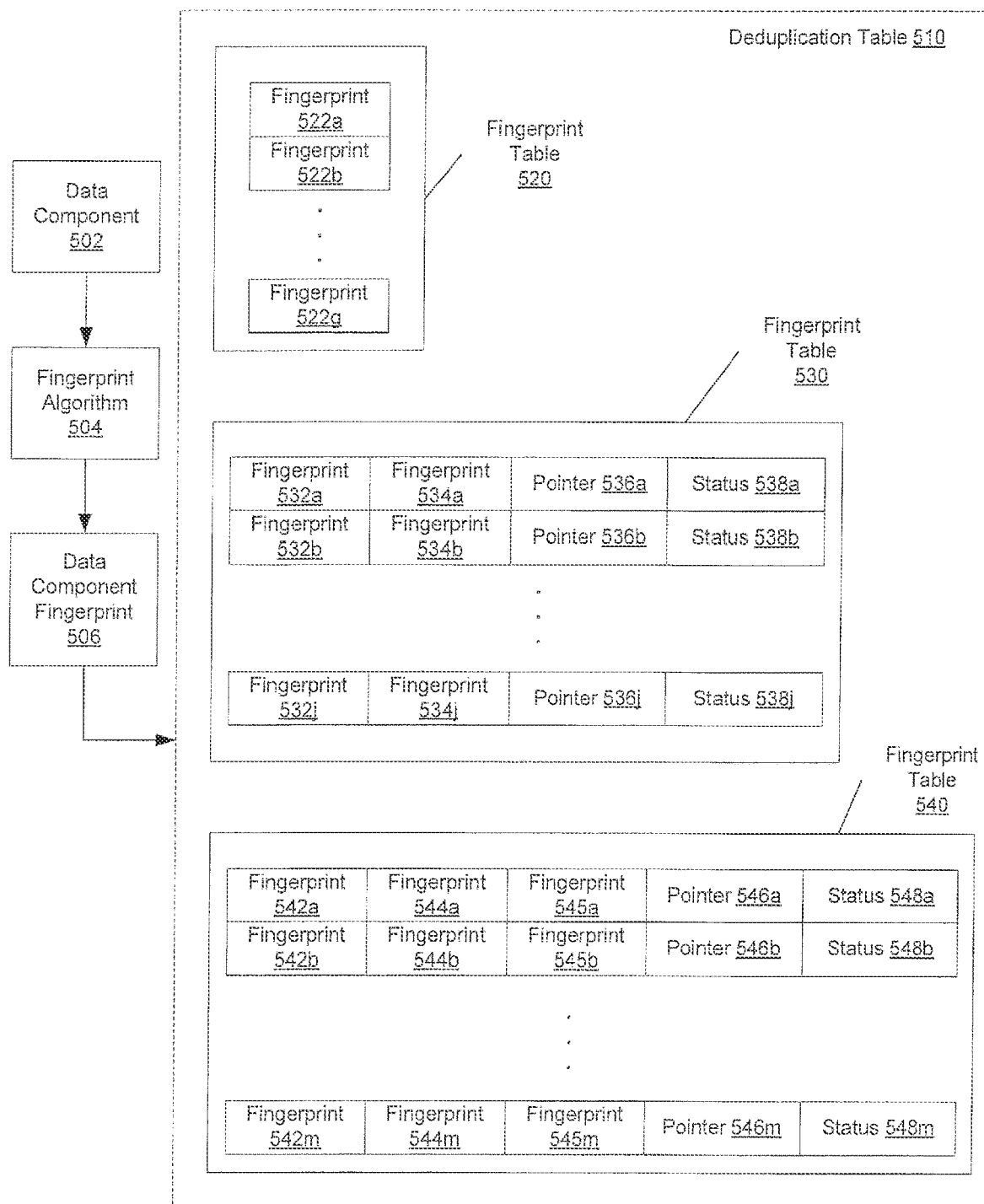
FIG. 6 is a generalized block diagram illustrating one embodiment of a deduplication table.

Referring now to FIG. 6, a generalized block diagram illustrating one embodiment of a logical representation of a deduplication table 510 is shown. The information stored in the deduplication table 510 may provide a fast location identification of data components stored in the data storage arrays 120a-120b. The information stored in the deduplication table 510 may include mappings between one or more calculated fingerprint values for a given data component and a physical pointer to a physical location in one of the storage devices 176a-176m holding the given data component. In addition, a length of the given data component and status information for a corresponding entry may be stored in the deduplication table 510.

As described earlier, a chunking/partitioning algorithm may produce a given data component 502 from data corresponding to a received request. A fingerprint algorithm 504 of multiple fingerprint algorithms may then be selected and used to produce a data component fingerprint 506. The resulting fingerprint value may then be used to access the deduplication table 510. In various embodiments, one or more fingerprint algorithms may be supported and one fingerprint algorithm may be more complex to perform than another fingerprint algorithm. Accordingly, the given fingerprint algorithm may consume more computation time than another. Additionally, some fingerprint algorithms may produce larger fingerprints than others and consume more storage space. For example, an MD5 type fingerprint algorithm may be more complex to perform than a CRC32C fingerprint algorithm. However, there may be fewer collisions, or false matches, associated with the first algorithm. In another example, the result of the fingerprint algorithm may be determined by keeping only some of the bits generated by a function such as MD5 or CRC32C. Keeping more bits requires more space, but may also reduce the likelihood of a collision. A collision may cause a read of data stored in persistent storage, such as the storage devices 176a-176m, for a subsequent comparison operation. The comparison may be performed to verify whether a match found in the deduplication table 510 corresponds to data stored in persistent storage that matches the value of the given data component 502. In addition, read operations for both data and attributes followed by comparison operations may be performed to determine which one of multiple matches may remain in persistent storage during deduplication of redundant data. The read operations and the comparison operations add processing time to a deduplication operation.

Switching between a first and a second fingerprint algorithm of multiple fingerprint algorithms may occur when a strategy for deduplication changes. In one embodiment, attributes such as those discussed above may be used by control logic to determine a strategy and changes to a strategy for deduplication. For example, a first strategy that utilizes less storage space for fingerprint values, but results in more collisions, may be chosen. At a later time, a second strategy may be chosen to replace the first strategy. The second strategy may utilize more storage space for fingerprint values resulting in fewer collisions. The later time for such a change in strategy for deduplication may occur during a given identified event, such as the events described earlier in FIG. 3, or otherwise.

Deduplication table 510 may comprise entries for all or only a portion of the data components stored in one or more of data storage arrays 120a-120b. In one embodiment, the deduplication table 510 may not be complete and therefore may not have an entry for each stored data component. Also, one or more entries within the deduplication table 510 may be evicted as further described later. In one embodiment, the fingerprint tables 520-540 together comprise some or all of a deduplication table depending on a chosen implementation. In other embodiments, the fingerprint tables 520 and 530 store copies of information stored in fingerprint table

540. Further, the fingerprint table 540 may be stored in volatile and/or non-volatile storage within the system (e.g., such as storage devices 176a-176m, RAM 172, processor cache(s), etc.).

In one embodiment, a lookup operation into the deduplication table 510 may be controlled by control logic in a storage controller. For example, attribute information may be used to determine how many of the fingerprint tables 520-540 to search. In addition, a type of a storage medium storing a given fingerprint table may determine how many input/output (I/O) accesses may be used to search a given fingerprint table. For example, a search determined to have a limited amount of time for lookup may access fingerprint tables stored in a processor cache or a non-persistent storage, but not access any fingerprint tables stored in persistent storage. Alternatively, a limited number of I/O accesses may be allowed to persistent storage. In addition, a lookup may access only particular portions of the deduplication table 510 based on an estimated probability of success.

Each entry in the fingerprint table 540 may comprise one or more calculated fingerprint values corresponding to a given data component, such as fingerprints 542a-545a in a first entry. Additionally, each of the fingerprints 542a-545a may be calculated from a different fingerprint algorithm. The pointer 546a may be a physical pointer or address for a given physical location within the storage devices 176a-176m. In addition, each entry may comprise status information, such as the status field 548a in the first entry. The status information may include a valid bit, a flag to indicate whether or not a corresponding data component is a candidate for deduplication, a length of the corresponding data component, and so forth.

Similar to the storage arrangement in the fingerprint table 540, each entry in the fingerprint table 530 may comprise one or more calculated fingerprint values corresponding to a given data component, such as fingerprint values 532a-534a in a first entry. In some embodiments, the fingerprint tables may be inclusive such that some of the fingerprint values 532a-534a stored in the fingerprint table 530 may be copies of one or more of the fingerprint values 542a-545a, 542b-545b, 542m-545m, and so forth, stored in the fingerprint table 540. In other embodiments, fingerprint values stored in one table are exclusive of those stored in another. All such embodiments are contemplated.

In one embodiment, the fingerprint table 530 holds a smaller number of entries than a number of entries in the fingerprint table 540. In addition, each entry in the fingerprint table 530 holds less information than an entry in the fingerprint table 540. Similarly, the fingerprint table 520 may hold a smaller number of entries than a number of entries in the fingerprint table 530 and each entry in the fingerprint table 520 may hold less information than an entry in the fingerprint table 530. In other embodiments, fingerprint table 530 may not hold a smaller number of entries than that of fingerprint table 540. Rather, fingerprint table 530 could hold more entries, and each entry could hold more information. Similarly, fingerprint table 520 could be larger than one or both of fingerprint table 530 and fingerprint table 540. Although the fields 522a-548m within the fingerprint tables 520-540 are shown in a particular order, other combinations are possible and other or additional fields may be utilized as well. The bits storing information for the fields 522a-548m may or may not be contiguous.

While fingerprint tables 520-540 are shown as tables, the tables 520-540 may be data structures such as a binary search tree, or an ordered binary tree, comprising a node-based data structure. In addition, while three fingerprint tables 520-540 are shown, different numbers of fingerprint tables are possible and contemplated. Further, one or more filters such as a Bloom filter may be included in the deduplication table 510. In such an embodiment, the filter may be accessed to quickly determine whether a calculated data component fingerprint 506 is within one or more of the fingerprint tables. For example, a filter may be configured to definitively indicate that a data component is not stored in a data table. If the filter does not rule out its presence, deduplication processing may continue or the data component may be stored in the data table.

As described earlier, a chosen fingerprint algorithm may be used to calculate the data component fingerprint 506. Subsequently, the data component fingerprint 506 may be used to access the deduplication table 510. The chosen fingerprint algorithm may be also used to determine which fingerprint values stored in the fingerprint tables 520-540 to compare to the data component fingerprint 506. For example, the fingerprint table 520 may store fingerprint values corresponding to data components predicted to have a relatively high probability of being deduplicated. In one embodiment, fingerprint table 520 may store information corresponding to the 5% of the total number of stored data components that have the highest probability of being deduplicated. The probability of deduplication for a given data component may be based, at least in part, on the attributes stored in the attributes table 640.

The data component fingerprint 506 may access one or more tables within deduplication table 510. If no matching fingerprint is found, then the corresponding data may be scheduled to be written to one of the storage devices 176a-176m. If a matching fingerprint is found, then the data corresponding to the matching fingerprint may be retrieved from storage and compared to the received write data. If the data is determined to be identical, then a new link for the stored data is created and the write data discarded. If the retrieved data is not identical to the write data or no matching fingerprint for the write data is found, then the write data is stored. In both cases, a new virtual to physical mapping table entry (e.g., in table 620) may be created for the write as previously discussed.

In one embodiment, the deduplication table 510 may store multiple entries for a given data component. For example, the deduplication table 510 may store an entry for a given 4 KB page as well as a separate entry for each 1 KB block within the given 4 KB page. Alternatively, a lookup into the deduplication table 510 may occur at a granularity of a 512-byte block. If a match is found and a duplicate copy of data stored in one of the data storage arrays 120a-120b is found and verified, a subsequent lookup of the next contiguous 512 bytes may be performed. If a fingerprint value match is found for this data block and a duplicate copy of data stored in one of the data storage arrays 120-120b is found and verified, a subsequent lookup of the next contiguous 512 bytes may be performed. This process may be repeated until no match is found. Therefore, deduplication of data components may be found at a finer granularity while also still maintaining table entries in the deduplication table 510 for larger sized data components.

For a deduplication table 510 that supports a finer granularity of sizes for data components, more fingerprint value hits may be produced during a lookup operation for a given received write request. For a deduplication table 510 that supports a more coarse granularity of sizes for data components, a higher storage efficiency may be achieved and fewer fingerprint value hits may be produced during a lookup operation for a given received write request. In some embodiments, a deduplicated data component may have neighboring data components that have also been deduplicated. For example, a given 512-byte data component may have a neighboring 512-byte deduplicated component; thus forming a 1 KB deduplicated block. In such a case, an entry may be added to the deduplication table 510 associated with the deduplicated 1 KB block. In this manner, data components and their corresponding entries are effectively coalesced to form larger blocks. Alternatively, a table entry within the deduplication table 510 corresponding to a larger data size may be divided to produce multiple table entries with corresponding smaller data sizes. Such a division may produce more fingerprint value hits during a lookup into the deduplication table 510.

Both a fingerprint algorithm and a data size or length corresponding to a table entry within the deduplication table 510 may be reconsidered. Such reconsideration may occur periodically, during identified events as described earlier in FIG. 3, or at any other desired time. As may be appreciated, making changes to the algorithm(s) used and/or data sizes used may result in changes to calculation times and may alter the probability of a collision. For example, increased data collisions may incur additional read operations of a persistent storage data location for a data comparison. Changes in the supported data size may result in more deduplications of smaller blocks or fewer deduplications of larger blocks. All such ramifications should be taken into account when making such changes.

In one embodiment, one or more entries within the deduplication table 510 may store a first fingerprint value for a corresponding data component. A second fingerprint value may be stored with the corresponding data component in one of the storage devices 176a-176m. In various embodiments, the first fingerprint value is a different and smaller fingerprint value than the second fingerprint value. Different fingerprint algorithms may be used to compute the first fingerprint value and the second fingerprint value. In another example, the first fingerprint value is a function of the fingerprint value (e.g., a subset of bits of the fingerprint value) and the second fingerprint value is also a function of the same fingerprint value (e.g., some or all of the remaining bits of the fingerprint value). During a lookup into the deduplication table 510, when a subset or an entire value of the data component fingerprint 506 matches a first fingerprint value in a given table entry, such as fingerprint 532*j* in the fingerprint table 530, a corresponding data storage location may be read. In embodiments in which the first fingerprint value is a subset of bits of the fingerprint value, a second fingerprint value may be stored in this data location in addition to a corresponding data component. Either a second fingerprint value different from the data component fingerprint 506 or a subset of the data component fingerprint 506 may be compared to the stored second fingerprint value. If there is a match, then a comparison may be performed between the stored data component and a data component value corresponding to a received read/write request, a garbage collection operation, or otherwise.

In one embodiment, the deduplication table 510 may be partitioned in a manner to allow one or more nodes in a cluster to process lookup operations for a given partition of the table. Therefore, deduplication may occur across multiple nodes to reduce storage space on a given node. A virtual-to-physical mapping table, such as the mapping table 620, may refer to data components across multiple nodes for increased storage efficiency. The deduplication table 510 may still be stored across storage devices within a cluster in the cluster and may be repartitioned without moving any of the stored data. A smaller portion of the deduplication table 510, such as the fingerprint tables 520-530 may be stored on each node while a larger portion, such as the fingerprint table 540, may be partitioned. Each time a node joins or leaves a given cluster, the deduplication table 510 may be repartitioned among the current nodes in the given cluster. The deduplication table 510 may support one deduplication address space across one or more volumes and snapshots on one or more nodes in the given cluster. In various embodiments, the deduplication table 510 may be divided among several nodes to increase the effective cache storage efficiency for a fingerprint lookup operation. This division of the deduplication table 510 may occur by fingerprint value, by fingerprint algorithm, by an estimated probability of success, by a storage strategy, by a random process, or otherwise.

In one embodiment, an entry is allocated, or registered, within the deduplication table 510 when a fingerprint lookup operation into the deduplication table 510 results in a miss. This miss may occur during an inline deduplication operation or a post-process deduplication operation. Additionally, as previously discussed in FIG. 2, on a hit a link table may be updated that stores links for deduplicated data. For example, responsive to successfully deduplicating received write data, a new entry is created in the link table. In some embodiments, new table entries may be registered during a post-process deduplication operation. In other words, during an inline deduplication operation, a miss during a fingerprint lookup into the deduplication table 510 does not produce registration of a table entry. During a post-process deduplication operation, a miss during a fingerprint lookup into the deduplication table 510 does produce registration of a table entry. In one embodiment, a duplicate copy is verified during deduplication by a matching fingerprint value. In another embodiment, a duplicate copy is verified by both a matching fingerprint value and a matching value for a corresponding data component. Numerous such embodiments are possible and are contemplated.

Figure 7:
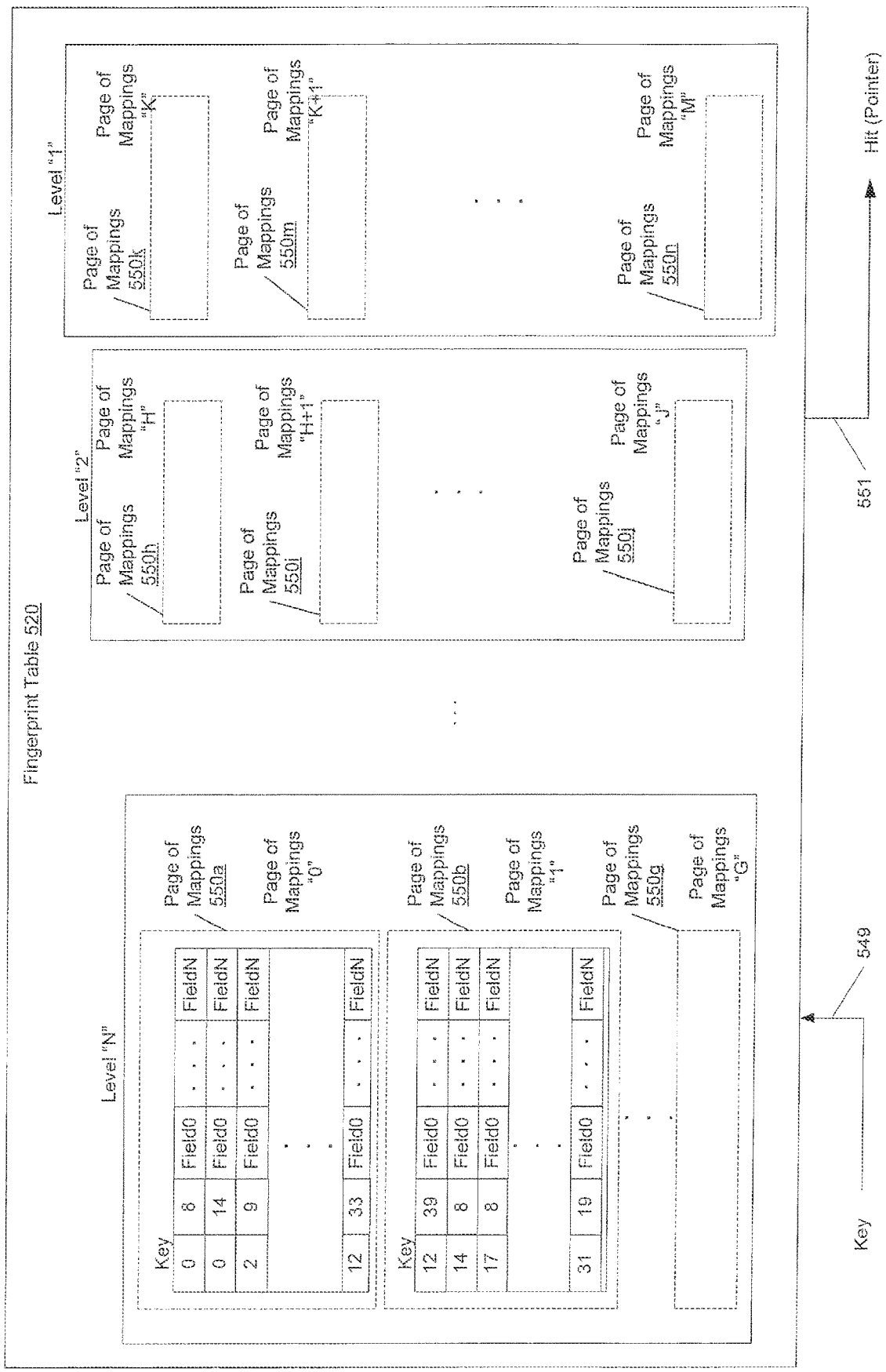
FIG. 7 is a generalized block diagram illustrating another embodiment of a deduplication table.

Turning now to FIG. 7, a generalized block diagram of one embodiment of a fingerprint table 520 is shown. For purposes of discussion, fingerprint table 520 will be described. However, the following discussion is not intended to be limited to fingerprint table 520 (e.g., as shown in FIG. 6). Rather, the discussion may be applicable fingerprint table 530, 540, and so on. As discussed earlier, one or more tables may be used for deduplication of duplicate copies of user data. In various embodiments, such tables (or similar table) may also be used for I/O redirection or translation, volume snapshot mappings, and so forth. The diagram shown in FIG. 7 represents a logical representation of one embodiment of the organization and storage of the fingerprint table. Each level shown may include deduplication table entries corresponding to a different period of time. For example, level "1" may include information older than information stored in level "2". Similarly, level "2" may include information older than information stored in level "3", and so on. The information stored in the records, pages and levels shown in FIG. 7 may be stored in a random-access manner within storage devices 176a-176m. Additionally, copies of portions or all of a given fingerprint table entries may be stored in RAM 172, in buffers within controller 174, in memory medium 130, and in one or more caches within or coupled to processor 122. In various embodiments, a corresponding index may be included in each level for mappings which are part of the level. Such an index may include an identification of fingerprint table entries and where they are stored (e.g., an identification of the page)

within the level. In other embodiments, the index associated with fingerprint table entries may be a distinct entity, or entities, which are not logically part of the levels themselves.

Generally speaking, each fingerprint table comprises a set of rows and columns. A single record may be stored in a fingerprint table as a row. A record may also be referred to as an entry. In one embodiment, a record stores at least one tuple including a key or fingerprint value. Tuples may (or may not) also include data fields including data such as a pointer used to identify or locate data components stored in storage subsystem 170. It is noted that in various embodiments, the storage subsystem may include storage devices (e.g., SSDs) which have internal mapping mechanisms. In such embodiments, the pointer in the tuple may not be an actual physical address per se. Rather, the pointer may be a logical address which the storage device maps to a physical location within the device. Over time, this internal mapping between logical address and physical location may change. In other embodiments, records in the fingerprint table may only contain key fields with no additional associated data fields. Attributes associated with a data component corresponding to a given record may be stored in columns, or fields, in the table. Status information, such as a valid indicator, a data age, a data size, and so forth, may be stored in fields, such as Field0 to FieldN shown in FIG. 7. In various embodiments, each column stores information corresponding to a given type. In some embodiments, compression techniques may be utilized for selected fields which in some cases may result in fields whose compressed representation is zero bits in length.

In the example shown, responsive to a hit on a key value 549, the fingerprint table 520 may convey a pointer 551 that indicates a location within the data storage subsystem 170 storing a data component corresponding to a received data storage access request (e.g., as discussed in FIG. 2). The key value may be compared to one or more key values stored in the deduplication table. In the illustrated example, simpler key values, such as "0", "2", "12" and so forth, are shown for ease of illustration. The physical pointer value 551 may be stored in one or more of the fields in a corresponding record. In some embodiments, the pointer value 551 may include a segment identifier (ID) and a physical address identifying the location of storage. A segment may be a basic unit of allocation in each of the storage devices 176a-176m. A segment may have a redundant array of independent device (RAID) level and a data type. During allocation, a segment may have one or more of the storage devices 176a-176m selected for corresponding storage. In one embodiment, a segment may be allocated an equal amount of storage space on each of the one or more selected storage devices of the storage devices 176a-176m. The data storage access request may correspond to multiple sectors, which may result in multiple parallel lookups. A write request may be placed in an NVRAM buffer, such as RAM 172, and a write completion acknowledgment may be sent to a corresponding client computer of the client computers 110a-110c. At a later time, an asynchronous process may flush the buffered write requests to the storage devices 176a-176m.

In various embodiments, a fingerprint table may comprise one or more levels as shown in FIG. 7. In one embodiment, the fingerprint table may comprise 16 to 64 levels, although other numbers of levels supported within a fingerprint table are possible and contemplated. In FIG. 7, three levels labeled Level "1", Level "2" and Level "N" are shown for ease of illustration. Each level within a fingerprint table may include one or more partitions. In one embodiment, each partition is a 4 kilo-byte (KB) page. For example, Level "N" is shown to comprise pages 550a-550g, Level "2" comprises pages 550h-550j and Level "1" comprises pages 550k-550n. It is possible and contemplated other partition sizes may also be chosen for each of the levels within a fingerprint table. In addition, it is possible one or more levels have a single partition, which is the level itself.

In one embodiment, multiple levels within a fingerprint table are sorted by time. For example, in FIG. 7, Level "1" may be older than Level "2". Similarly, Level "2" may be older than Level "N". In one embodiment, when a condition for inserting one or more new records in the fingerprint table is detected, a new level may be created. In various embodiments, when a new level is created the number/designation given to the new level is greater than numbers given to levels that preceded the new level in time. For example, if the most recent level created is assigned the value 8, then a newly created level may be assigned the value 9. In this manner a temporal relationship between the levels may be established or determined. As may be appreciated, numerical values need not be strictly sequential. Additionally, alternative embodiments may reverse the numbering scheme such that newer levels have smaller numerical designations. Further, other embodiments may utilize non-numerical designations to distinguish between levels. Numerous such embodiments are possible and are contemplated. Each next older level has a label decremented by one from a label integer value of a previous younger level. A separate table not shown may be used to logically describe the fingerprint table. For example, each entry of the separate table may include a given level ID and a list of the page IDs stored within the given level ID.

By creating a new highest level for an insertion of new records, the fingerprint table is updated by appending the new records. In one embodiment, a single level is created as a new highest level and each of the new records is inserted into the single level. In another embodiment, the new records may be searched for duplicate keys prior to insertion into the fingerprint table. A single level may be created as a new highest level. When a given record storing a duplicate key is found, each of the records buffered ahead of the given record may be inserted into the single level. The new records may be buffered in a manner to preserve memory ordering, such as in-order completion of requests. Then another single level may be created and the remainder of the new records may be inserted into this other single level unless another record storing a duplicate key is found. If such a record is found, then the steps are repeated. Existing records within the fingerprint table storing a same key value as one of the new records are not edited or overwritten in-place by the insertion of the new records.

Although the sizes of the levels are illustrated as increasing with lower levels being larger than newer levels, the higher levels may alternate between being larger or smaller than neighboring levels. The number of newer records to insert into the fingerprint table may vary over time and create the fluctuating level sizes. The lower levels may be larger than newer levels due to combining or flattening of the lower levels. Two or more lower levels may be flattened into a single level when particular conditions are detected.

With no edits in-place for the records stored in the fingerprint table, newer records placed in higher levels may override records storing a same key value located in the lower levels. For example, when the fingerprint table is accessed by a given key value, one or more levels may be found to store a record holding a key value matching the given key value. In such a case, the highest level of the one or more levels may be chosen to provide the information stored in its corresponding record as a result of the access. Further details are provided later. In addition, further details about the detected conditions for inserting one or more new records into the fingerprint table and the storage of information are provided later.

In one embodiment, entries within a given page may be sorted by key. For example, the entries may be sorted in ascending order according to a key included in the entry. Additionally, in various embodiments, the pages within a level may be sorted according to any desired sort order. In various embodiments, the pages within a level may also be sorted (e.g., according to key values or otherwise). In the example of FIG. 7, page 550a of Level N includes records sorted according to key value in ascending order. In various embodiments, one or more columns may be used to store key values. In the example of FIG. 7, two columns or fields are shown in each tuple for storing key values. Utilizing such key values, the records then may be sorted in a desired order. Sorting may be performed based on any of the key values for a records, or any combination of key values for the record. In the example shown, the first record stores a key value including 0 and 8 stored in two columns, and the last record stores a key value including 12 and 33. In this illustrated example, each sorted record in page 550a between the first and the last record stores a key value between 0 and 12 in the first column and the records are arranged in a manner to store key values based (at least in part) on the first column in an ascending order from 0 to 12. Similarly, page 550b includes sorted records, wherein the first record stores key values of 12 and 39 and the last record stores key values of 31 and 19. In this illustrated example, each sorted record in page 550b between the first and the last record stores a key value between 12 and 31 in the first column and the records are arranged in a manner to store key values in an ascending order from 12 to 31.

In addition to the above, the pages within Level N are sorted according to a desired order. In various embodiments, pages within a level may be sorted in a manner that reflects the order in which entries within a page are sorted. For example, pages within a level may be sorted according to key values in ascending order. As the first key value in page 550b is greater than the last key value in page 550a, page 550b follows page 550a in the sort order. Page 550g would then include entries whose key values are greater than those included in pages 550a-550f (not shown). In this manner, all entries within a level are sorted according to a common scheme. The entries are simply subdivided into page, or other, size units. As may be appreciated, other sorting schemes may be used as desired.

Figure 8:
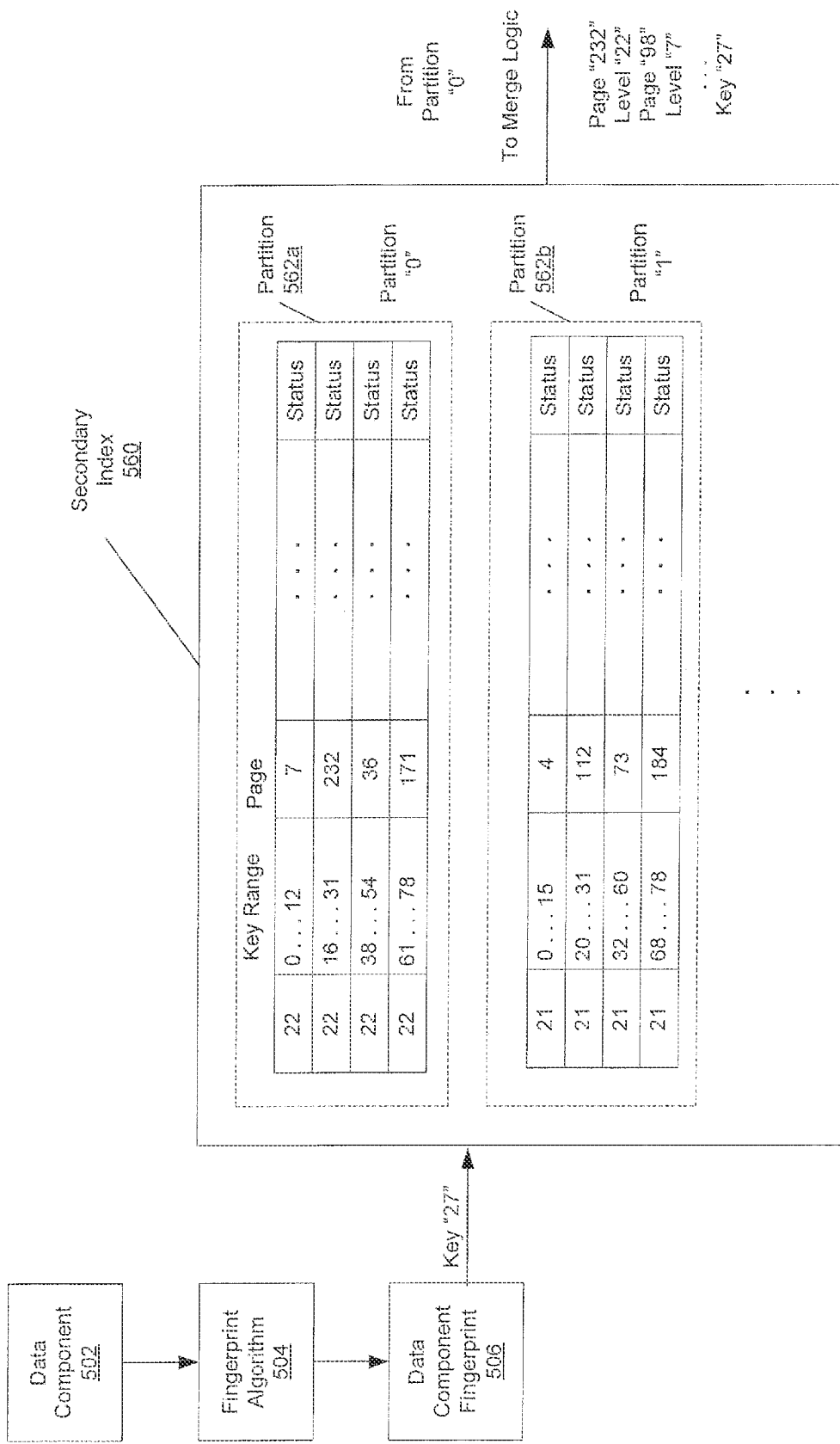
FIG. 8 is a generalized block diagram illustrating one embodiment of a secondary index used to access a deduplication table.

Referring now to FIG. 8, a generalized block diagram of one embodiment of a secondary index 560 used to access a fingerprint table is shown. As described earlier, data component 502 may be received by a fingerprint algorithm 504, which produces a fingerprint 506. The fingerprint 506 is used to access an index for a fingerprint/deduplication table. In some embodiments, the deduplication table discussed above may be too large (or larger than desired) to store in RAM 172 or memory medium 130. Therefore, a secondary index 320 may be cached for at least a portion of the primary index instead of the corresponding portion of the primary index 310. The secondary index 560 may provide a more coarse level of granularity of location identification of data stored in the storage devices 176a-176m. Therefore, the secondary index 560 may be smaller than the portion of the table 520 to which it corresponds. Accordingly, the secondary index 560 may be stored in RAM 172 or in memory medium 130.

In one embodiment, the secondary index 560 is divided into partitions, such as partitions 562a-562b. Additionally, the secondary index may be organized according to level with the more recent levels appearing first. In one embodiment, older levels have lower numbers and younger levels have higher numbers (e.g., a level ID may be incremented with each new level). Each entry of the secondary index 560 may identify a range of key values. For example, the first entry shown in the example may identify a range of key values from 0 to 12 in level 22. These key values may correspond to key values associated with a first record and a last record within a given page of the a fingerprint table 520. In other words, the entry in the secondary index may simply store an identification of key 0 and an identification of key 12 to indicate the corresponding page includes entries within that range. Since remappings are maintained in the levels within the mapping table, a range of key values may correspond to multiple pages and associated levels. Various fields within the secondary index 560 may store this information in a manner similar to that shown in FIG. 7. Each entry may store one or more corresponding unique virtual page identifiers (IDs) and associated level IDs corresponding to the range of key values. Each entry may also store corresponding status information such as validity information. The list of maintained page IDs and associated level IDs may indicate where a given query key value might be stored, but not confirm that the key value is present in that page and level. The secondary index 560 is smaller than the primary index 510, but also has a coarse-level of granularity of location identification of data stored in the storage devices 176a-176m. The secondary index 560 may be sufficiently small to store in RAM 172 or in memory medium 130.

When the secondary index 560 is accessed with a query key value 506, it may convey one or more corresponding page IDs and associated level IDs. These results are then used to access and retrieve portions of the stored primary index. The one or more identified pages may then be searched with the query key value to find a physical pointer value. In one embodiment, the level IDs may be used to determine a youngest level of the identified one or more levels that also store the query key value 506. A record within a corresponding page may then be retrieved and a physical pointer value may be read for processing a storage access request. In the illustrated example, the query key value 27 is within the range of keys 16 to 31. The page IDs and level IDs stored in the corresponding entry are conveyed with the query key value to the fingerprint table. Corresponding pages within persistent storage may be accessed if the query key value is not found in a higher level fingerprint table.

Figure 9:
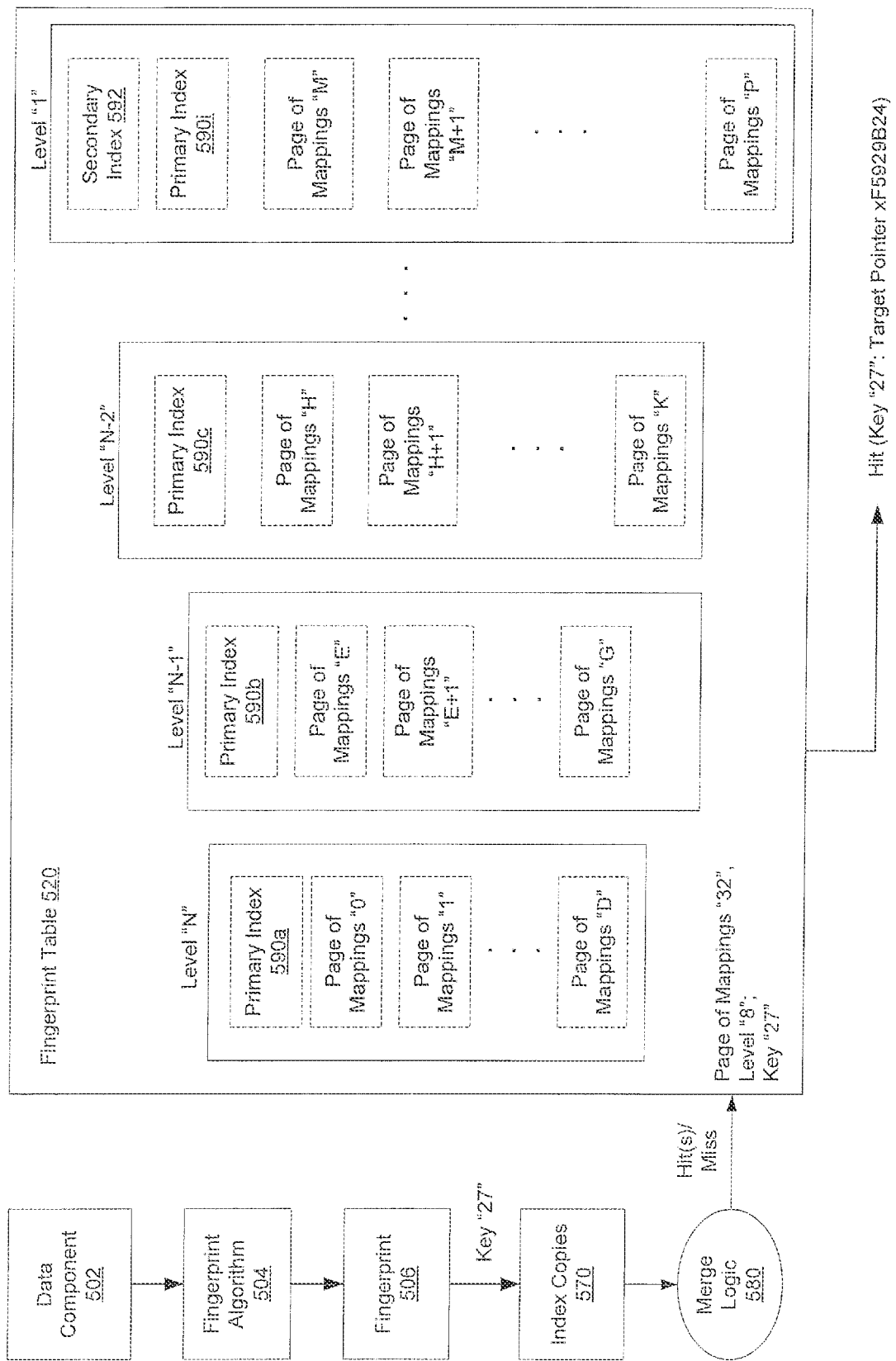
FIG. 9 is a generalized block diagram illustrating one embodiment of a secondary index used to access a deduplication table.

Turning now to FIG. 9, a generalized block diagram of another embodiment of a fingerprint table 520 and an index used to access the table is shown. Circuit and logic portions corresponding to those of FIG. 8 are numbered identically. A copy of one or more of the primary index portions 590a-590i may be included in may be stored in one or more levels of the storage hierarchy (e.g., cached copies). In the embodiment shown, the information in primary indexes 590a-590i may be stored with the pages of mappings in storage devices 176a-176m. Also shown is a secondary index 592 which may be used to access a primary index, such as primary index 590i shown in the diagram. Similarly, accessing and updating the mapping table 340 may occur as described earlier.

As shown, Fingerprint table 520 comprises multiple levels, such as Level "1" to Level "N". In the illustrated example, each of the levels includes multiple pages. Level "N" is shown to include pages "0" to "D", Level N−1 includes pages "E" to "G", and so forth. Again, the levels within the table 510 may be sorted by time. Level "N" may be younger than Level "N−1" and so forth. Fingerprint table 520 may be accessed by at least a key value. In the illustrated example, fingerprint table 520 is accessed by a key value "27" and a page ID "32". For example, in one embodiment, a level ID "8" may be used to identify a particular level (or "subtable") of the fingerprint table 520 to search. Having identified the desired subtable, the page ID may then be used to identify the desired page within the subtable. Finally, the key may be used to identify the desired entry within the desired page.

As discussed above, an access to a cached portion of the index 570 may result in multiple hits. In one embodiment, the results of these multiple hits are provided to merge logic 580 which identifies which hit is used to access the fingerprint table 520. Merge logic 580 may represent hardware and/or software which is included within a storage controller. In one embodiment, merge logic 580 is configured to identify a hit which corresponds to a most recent (newest) mapping. Such an identification could be based upon an identification of a corresponding level for an entry, or otherwise. In the example shown, a query corresponding to level 8, page 32, key 27 is received. Responsive to the query, page 32 of level 8 is accessed. If the key 27 is found within page 32 (a hit), then a corresponding result is returned (e.g., pointer xF3209B24 in the example shown). If the key 27 is not found within page 32, then a miss indication is returned. This physical pointer value may be output from the fingerprint table 520 to service a lookup request corresponding to the key value "27".

In addition to the above, in various embodiments the storage system may simultaneously support multiple versions of the data organization, storage schemes, and so on. For example, as the system hardware and software evolve, new features may be incorporated or otherwise provided. Data, indexes, and mappings (for example) which are newer may take advantage of these new features. In the example of FIG. 9, new level N may correspond to one version of the system, while older level N−1 may correspond to a prior version. In order to accommodate these different versions, metadata may be stored in association with each of the levels which indicates which version, which features, compression schemes, and so on, are used by that level. This metadata could be stored as part of the index, the pages themselves, or both. When accesses are made, this metadata then indicates how the data is to be handled properly. Additionally, new schemes and features can be applied dynamically without the need to quiesce the system. In this manner, upgrading of the system is more flexible and a rebuild of older data to reflect newer schemes and approaches is not necessary.

Figure 10:
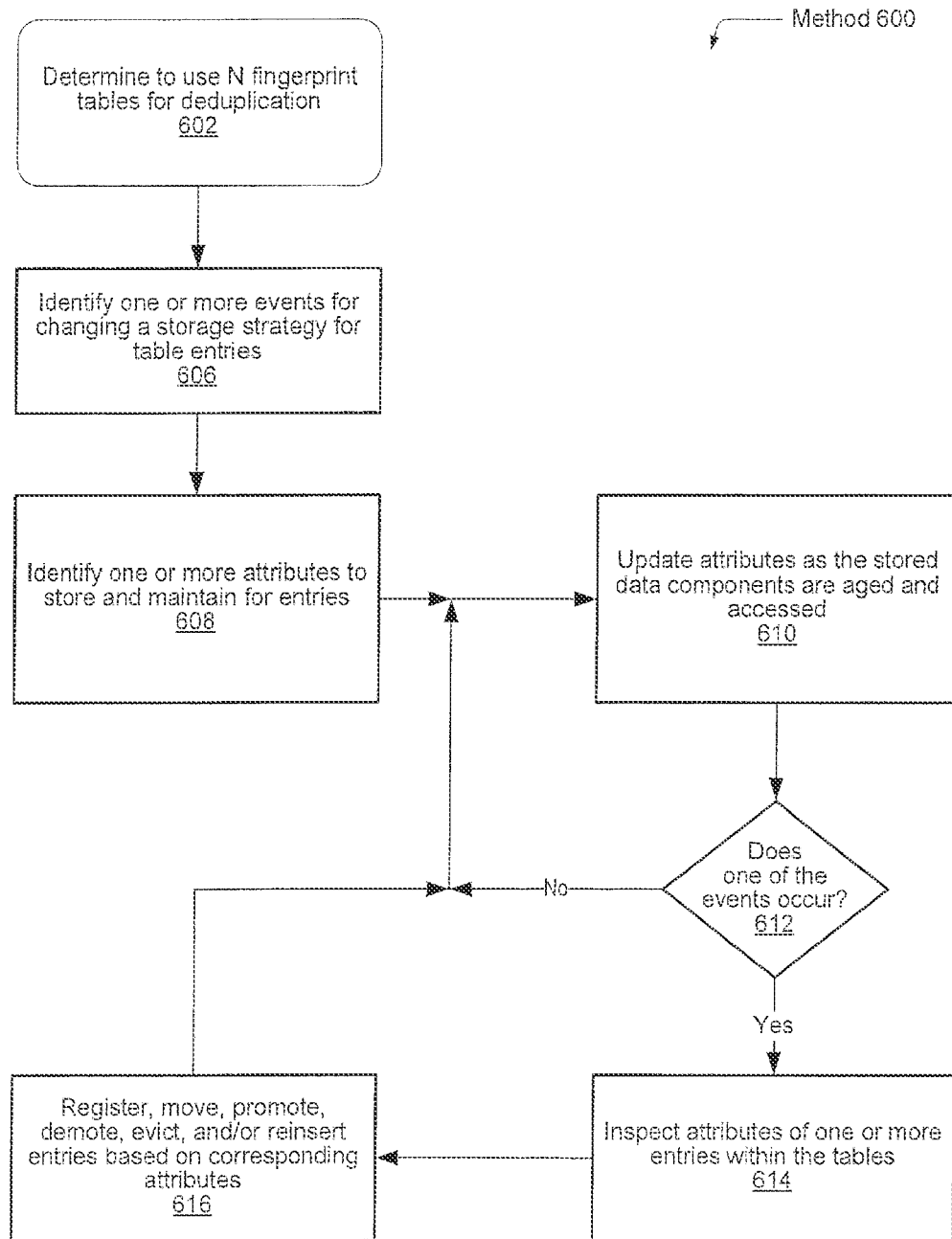
FIG. 10 is a generalized flow diagram illustrating one embodiment of a method for supporting multiple deduplication fingerprint tables.

Referring now to FIG. 10, one embodiment of a method 600 for supporting multiple fingerprint tables is shown. The components embodied in the network architecture 100, system 400, deduplication table 510 and fingerprint table(s) 520 described above may generally operate in accordance with method 600. For purposes of discussion, the steps in this embodiment are shown in sequential order. However, some steps may occur in a different order than shown, some steps may be performed concurrently, some steps may be combined with other steps, and some steps may be absent in another embodiment.

In block 602, a number N (where N is an integer) of fingerprint tables are determined to be supported and store values, such as fingerprint values, corresponding to stored data components. Each of the N fingerprint tables may have an associated probability for corresponding data components to be deduplicated. One or more of the N fingerprint tables may be stored on a separate storage medium from the other fingerprint tables. One or more of the N fingerprint tables with the higher associated probabilities of deduplication may be stored in a higher level of a memory hierarchy than the remainder of the N fingerprint tables. For example, one or more of the N fingerprint tables may be stored in RAM 172, whereas the remainder of the N fingerprint tables may be stored in persistent storage in storage devices 176a-176m. In some embodiments, copies of one or more of the N fingerprint tables may be stored in a higher level of the storage hierarchy. Therefore, there may be two copies of the one or more N fingerprint tables on separate storage media.

In block 606, one or more events are identified for changing (or reevaluating) a storage strategy or arrangement for entries within the N fingerprint tables. Examples of such events may include a garbage collection operation, a pruning/trimming operation, a secure erase operation, a reconstruct read operation, a given stage in a read/write pipeline for a received read/write request, a received batch operation that accesses physical locations within persistent storage, a received batch operation that transforms or relocates data components within the persistent storage.

In block 608, one or more attributes corresponding to data components stored in the persistent storage are identified for storage. The attributes may be used to change a storage strategy or arrangement for entries within the N fingerprint tables. Examples of such attributes include at least those discussed above in relation to FIG. 4. In block 610, one or more of the stored attributes may be updated as data components are aged or accessed. In one embodiment, a given period of time and each data storage access may be included as an event with the events described regarding block 606. If one of the identified events occurs (decision block 612), then in block 614 one or more of the attributes corresponding to one or more stored data components are read for inspection. In block 616, based on the attributes that are read, one or more entries within the N fingerprint tables may be moved from one fingerprint table to another. Additionally, entries may be reordered within a given fingerprint table based on their corresponding attributes. For example, the entries may be sorted by one or more stored fingerprint values for ease of lookup. One or more entries may be promoted from a lower-level fingerprint table to a higher-level fingerprint table, wherein entries within the higher-level fingerprint table correspond to stored data components that have a higher probability of being deduplicated based on their attributes.

In addition to the above, one or more entries within the N fingerprint tables may be evicted from the fingerprint table 520 altogether. This eviction of one or more entries may occur when a determination is made based on associated attributes that the one or more entries correspond to stored data components with a low probability of being deduplicated. In addition, based on associated attributes, entries within the N fingerprint tables may be evicted in order to prevent deduplication among data components with a large number of references, to remove entries that cause false matches, or collisions, during a deduplication operation, and to remove entries that no longer have a valid physical address for the data component to which they refer.

As described earlier, for each entry that is evicted, in one embodiment, an indication of the eviction may be written to a corresponding physical location within one of the data storage arrays 120a-120b. In another embodiment, an indication of the eviction may be written in an associated entry of another data structure. A stored indication may allow for reevaluation at a later time of a given evicted data component. The associated attributes may be read and used to determine whether the given evicted data component may now have a probability of being deduplicated above a given threshold. If it is determined the given evicted data component has a probability of being deduplicated above a given threshold, then a corresponding entry may be allocated in one of the N fingerprint tables.

Figure 11:
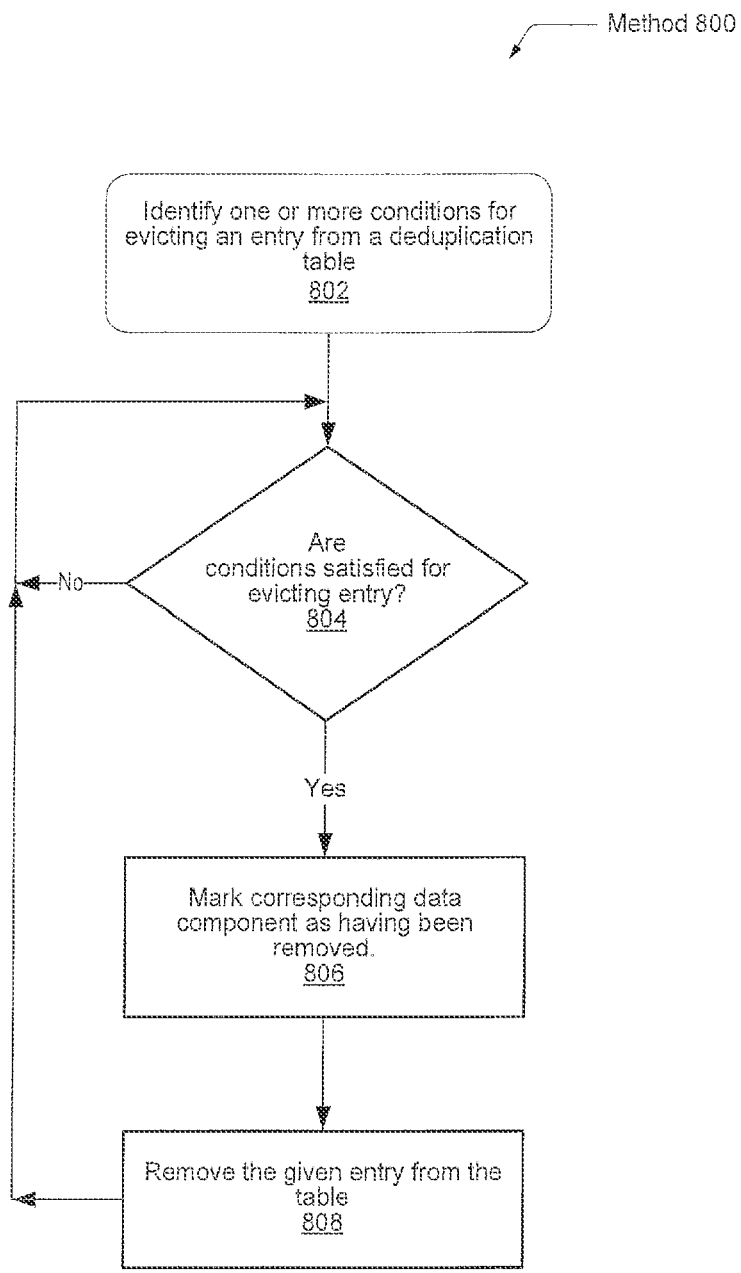
FIG. 11 is a generalized flow diagram illustrating one embodiment of a method for removing entries from a deduplication table.

Referring now to FIG. 11, one embodiment of a method 800 for eviction from a deduplication table is shown. In block 802, one or more conditions are identified for evicting an entry from a deduplication table. Here, eviction refers to removing information stored in a given entry from the entire deduplication table. If a deduplication table includes multiple fingerprint tables, such as tables 520-540, information stored within a given entry may be removed and no longer be stored in any of the fingerprint tables. In various embodiments, data that is deemed to have a relatively low probability of being deduplicated may have its entry removed from the deduplication table(s). This eviction may in turn reduce the size of the deduplication table and reduce an amount of effort required to maintain the table.

In the example shown, the identified conditions for use in determining eviction may include one or more of a size of the deduplication table reaching a given threshold, a given data component has a predicted probability of being deduplicated that falls below a given threshold, a given data component has a history of being deduplicated that falls below a given threshold, a given data component with an associated large number of references is identified as being removed from a deduplication operation, a given data component reaches a given threshold for a number of false matches (collisions), and a given data component does not have a valid physical address. One or more attributes, such as the attributes discussed above may be used to determine whether eviction may occur and to identify one or more entries within a deduplication table for eviction. In various embodiments, eviction may also occur during garbage collection operations.

If conditions are satisfied for evicting a given entry in a deduplication table (decision block 804), then a corresponding data component may be marked as being removed from the table (block 806). In one embodiment, an indication of the eviction may be written to a corresponding physical location within one of the data storage arrays 120a-120b, and the given entry in the deduplication table may be deallocated (block 808). A stored indication may allow for reevaluation at a later time of a given evicted data component.

Figure 12:
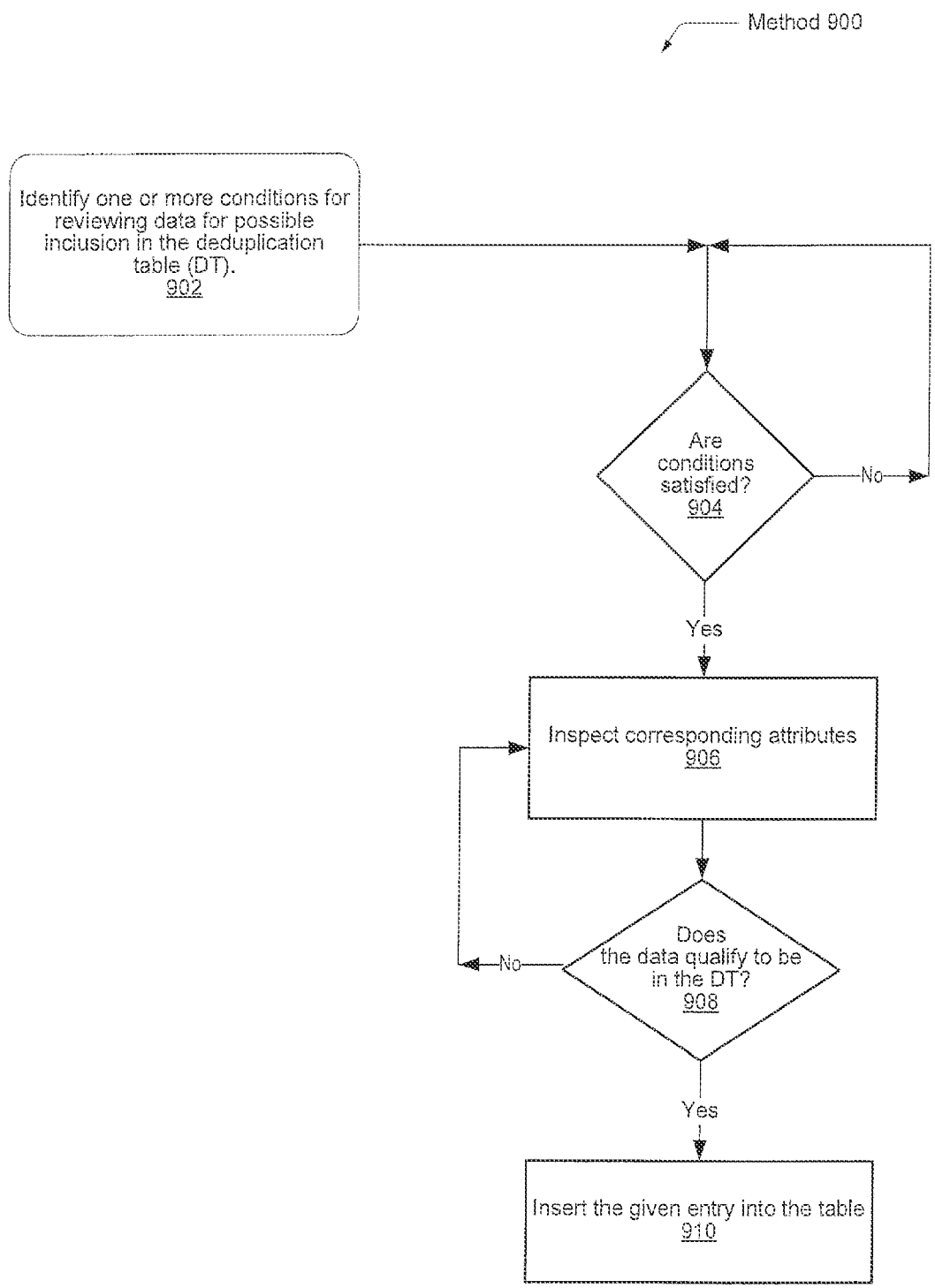
FIG. 12 is a generalized flow diagram illustrating one embodiment of a method for reinserting evicted entries into a deduplication table.

Referring now to FIG. 12, one embodiment of a method 900 for inserting an entry into a deduplication table is shown. In block 902, one or more conditions are identified for reviewing a data component which does not currently have an entry in the deduplication table. In one embodiment, one condition for performing such a review may be initiation of a garbage collection operation. Other examples of conditions may include the occurrence of events identified in block 206 in method 200 and the conditions described in block 616 of method 600. The timing of such a review may be set in a manner to minimize or otherwise reduce the impact on other system operations.

If conditions are satisfied for reviewing a data component (decision block 904), then corresponding attributes for the given data component may be read and inspected (block 906). For example, one or more attributes such as those discussed above may be used to determine whether insertion may occur. In various embodiments, metadata within the system indicates whether a corresponding data component does or does not have a corresponding entry in the deduplication table. A given data component/entry may qualify for insertion in the deduplication table when one or more conditions for its exclusion are no longer valid, such as the conditions described above regarding block 802 of method 800. The attributes of a corresponding data component may change over time and allow the data component to have an associated entry in the deduplication table again.

If a given evicted entry qualifies to be reinserted in the deduplication table (decision block 908), then an entry in the deduplication table is allocated for a corresponding data component (block 910) and any markings that indicate the data component does not have an entry in the deduplication table may be removed or invalidated.

Figure 13:
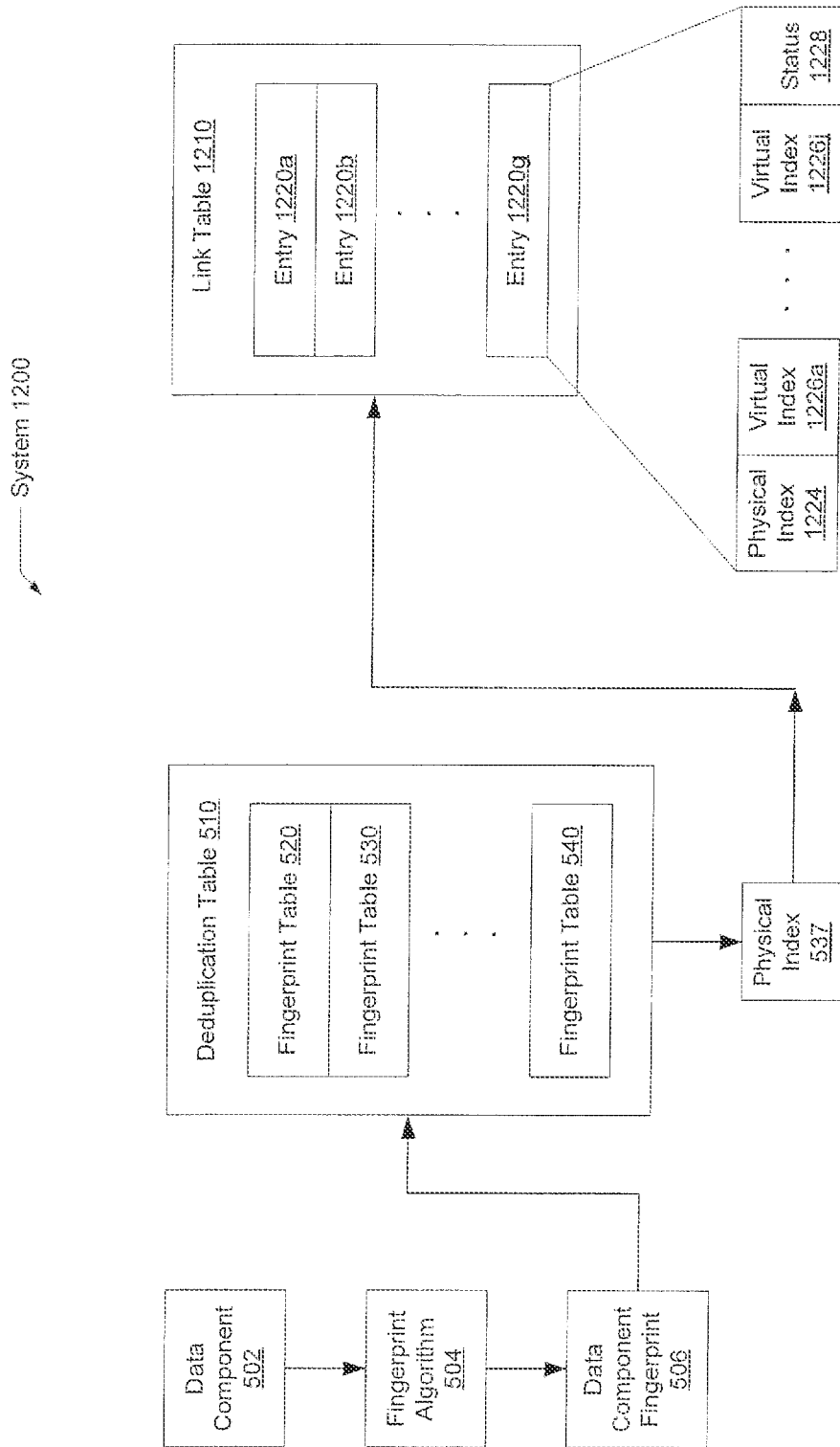
FIG. 13 is a generalized block diagram illustrating an embodiment of a system for maintaining reverse address mappings.

Referring now to FIG. 13, a generalized block diagram illustrating one embodiment of a system 1200 for maintaining reverse address mappings using a link table 1210 is shown. As described above, virtual-to-physical mapping information may be stored in mapping table 620. In addition, address-mapping information may be stored in each page of data within each of the storage devices 176a-176m. Each of the data storage arrays 120a-120b supports multiple virtual addresses in requests from each of the client computer systems 110a-110c referencing a same, single physical address. For example, a first virtual address corresponding to client 110a and a second virtual address corresponding to client 110b may reference a same data component or a same data block identified by a same given physical address. In this example, the first virtual address may have a value of "VX". The second virtual address may have a value of "VY". The same given physical address may have a value of "PA". These values are arbitrary and chosen to simplify the illustrated example. The mapping table 620 may store mapping information such as "VX-to-PA" and "VY-to-PA".

Continuing with the above example, over time, the first virtual address, "VX", may later be included in a write request from client 110a with modified data. The new modified data may be written to one or more of the storage devices 176a-176m. The new information for the physical block may be stored in a physical location identified by a new physical address different from the given physical address. For example, the new physical address may have a value "PB", which is different from the value "PA" of the given physical address. A new virtual-to-physical mapping may be stored in a mapping table 620, such as "VX-to-PB". The given physical address, "PA", still has a link to one virtual address, which is the second virtual address corresponding to client 110b, or "VY-to-PA" stored in the table 620. Subsequently, the second virtual address, "VY", may later be included in a write request from client 110b with modified data. Again, the new modified data may be written to one or more of the storage devices 176a-176m. The new information for the physical block may be stored in a physical location identified by a new physical address different from the given physical address. For example, the new physical address may have a value "PC", which is different from the value "PA" of the given physical address. A new virtual-to-physical mapping may be stored in a corresponding table 620, such as "VY-to-PC". The given physical address, "PA", now has no links to it. A garbage collection operation may deallocate the physical block corresponding to the given physical address "PA" due to a count of zero currently valid links and/or other corresponding status information.

A problem may occur during garbage collection if inline deduplication causes no update of mapping information. For example, when a write request from client 100a to virtual address VX occurs, no matching fingerprint value 506 may be found in the fingerprint table 520 during an inline deduplication operation. Consequently, mapping may be stored in the mapping table 620, such as "VX-to-PA", and a physical data block may be scheduled to be written to the physical address "PA". In addition, the mapping information "VX-to-PA" may be written with the data in the physical location identified by physical address "PA". Alternatively, the mapping information may be stored in a corresponding log in a storage device, wherein the log corresponds to multiple physical locations such as the location identified by the physical address A. In one embodiment, at this time, an entry may be registered in the deduplication table 510 corresponding to this write request. In another embodiment, an entry may be registered in the deduplication table 510 corresponding to this write request during a post-process deduplication operation. Regardless of when an entry is registered in the deduplication table 510, a corresponding entry may exist in the deduplication table 510 when a write request is received from client 110b to virtual address VY.

When the write request from client 100b to virtual address "VY" is received, a matching fingerprint value 506 may be found in the deduplication table 510 corresponding to physical address PA and a match of the data verified. In such a case, a mapping may be stored in the table 620, such as "VY-to-PA". As a write of the data is not performed, the mapping information "VY-to-PA" is not written with the data in the physical location identified by physical address "PA". Subsequently, a later write request from client 100a to virtual address "VX" may occur with new modified data. No matching fingerprint value 506 may be found in the deduplication table 510 during an inline deduplication operation, and a corresponding mapping stored in the table 620, such as "VX-to-PB". In this case, the mapping information "VX-to-PB" may be written with the data in the physical location identified by the physical address "PB".

When the garbage collector is executed, the application may inspect both the physical location identified by the physical address "PA" and the table 620. The garbage collector may find the mapping information, "VX-to-PA", stored with (or otherwise in association with) the corresponding page identified by the physical address "PA". However, no valid corresponding entry in the table 620 storing the same mapping information "VX-to-PA" is found. In addition, no other valid links to the physical address "PA" may be found, although virtual address "VY" is referencing physical address "PA". Therefore, a count of links to the physical address "PA" is erroneously determined to be zero. The garbage collector may then deallocate the physical location identified by the physical address "PA". Consequently, the link corresponding to the mapping "VY-to-PA" is broken and data corruption may have occurred.

In order to avoid the above problem without scheduling a data write request to the storage devices 176a-176m, a link table 1210 may be used. Although scheduling a write request to update the mapping information from ("VX-to-PA") to ("VX-to-PA", "VY-to-PA") stored in the physical location identified by the physical address "PA" may prevent broken links, the benefit of the inline deduplication operation would be reduced and write amplification of SSDs may be increased. Therefore, in order to address at least these issues, the link table 1210 may be utilized to hold reverse mapping information. The link table 1210 may comprise a plurality of entries 1220a-1220g. Each of the entries 1220a-1220g may include a physical index 1224 that identifies a physical location in the storage devices 176a-176m. In addition, one or more virtual indexes 1226a-1226j may be included to provide reverse mapping information. The status information 1228 may indicate whether a corresponding entry stores one or more valid reverse mappings.

In one embodiment, the link table 1210 has an entry allocated or updated when an inline deduplication operation determines a duplicate copy exists in storage for a corresponding data component 502. A corresponding physical index 537 found during the inline deduplication operation may be used to update the link table 1210. Referring to the above example, the link table 1210 may be updated with the reverse mapping information "PA-to-VY" during processing of the write request from client 110b to virtual address "VY". When the garbage collector is executed, it may inspect both the physical location identified by the physical address "PA", the mapping table 620 and the link table 1210. The garbage collector may find the mapping information, "VX-to-PA", stored in the corresponding page identified by the physical address "PA". A valid corresponding entry in the table 620 storing the same mapping information, "VX-to-PA", may not be found. However, the garbage collector may access the link table 1210 with the physical address "PA" and find a valid entry with the reverse mapping information "PA-to-VY". Therefore, a count of links to the physical address "PA" is one, or nonzero. Accordingly, the garbage collector does not deallocate the physical location identified by the physical address "PA" and the problem discussed above is avoided. In another embodiment, the data corresponding to "PA" is stored in one location and the mapping information "VX to PA" and "VY to PA" stored in another location. In yet another embodiment, the data corresponding to "PA" is stored in one location and the mappings "VX to PA" and "VY to PA" are stored in a link table, but not adjacent to one another. Instead, they may be stored in a table with a structure similar to that described in FIG. 9, with the key for both mapping entries being the physical address "PA" (or based at least in part on the "PA"). For example, in such a table, "VX to PA" may be stored in Level N−2 and "VY to PA" stored in Level N. A lookup of "PA" in the table would then return both mappings.

In addition to the above, during garbage collection the physical location identified by the physical address "PA" may be updated with the mapping information "VY-to PA" due to the valid entry in the link table 1210. Given such an update, the entry in the link table 1210 may be deallocated. If the table 620 is ever lost, the mapping information stored in the physical locations in the storage devices 176a-176m and the reverse mapping information stored in the link table 1210 may be used to rebuild the table 620. In one embodiment, the deduplication table 510, or a portion of the table 510, may be organized in a same manner as that of the mapping table 620. Additionally, the link table 1210 may also be organized in a same manner as the mapping table 620.

As described above, when an inline deduplication operation determines a duplicate copy of data is stored in the system, corresponding mapping information may be stored in each of the table 620 and the link table 1210 with no write of the data to storage. These steps coordinate with garbage collection that frees physical locations in the persistent storage. The coordination may be relatively coarse since freeing physical locations may be performed later and batched separately from garbage collection migrating physical blocks within a corresponding one of the storage devices 176a-176m. Since migration may occur prior to deallocation of physical locations during garbage collection, when a physical block is moved a new physical location for data may have stored mapping information updated with its own physical address and updates stored in the mapping table 620. Both corresponding log areas and page header information may be updated. Afterward, the table 620 may be updated with the new physical addresses. Following this, the deduplication table 510 and then the link table 1210 may be updated with the new physical addresses. This update removes links to the old physical addresses.

If the deduplication table 510 or the link table 1210 contains old references, then the corresponding physical locations may be cleaned once more before it is freed. The deduplication table 510 may not be as compressible as the table 620, since the fingerprint value and physical pointer pairs may be random or more random than the entries in the table 620. Further, the deduplication table 510 may be less cacheable, since the fingerprint values may be random and table 510 is indexed by fingerprint values. Regarding the table 620, entries corresponding to idle data, such as in idle volumes, may be kept out of caches. Such factors result in more read operations for a deduplication operation. Therefore, the multiple fingerprint tables 520-540 are used and allow one or more smaller tables to be cached. In one embodiment, the tables corresponding to data components with a higher probability being deduplicated may be accessed during inline deduplication. The other tables may be accessed during post-process deduplication, such as during garbage collection.

Figure 14:
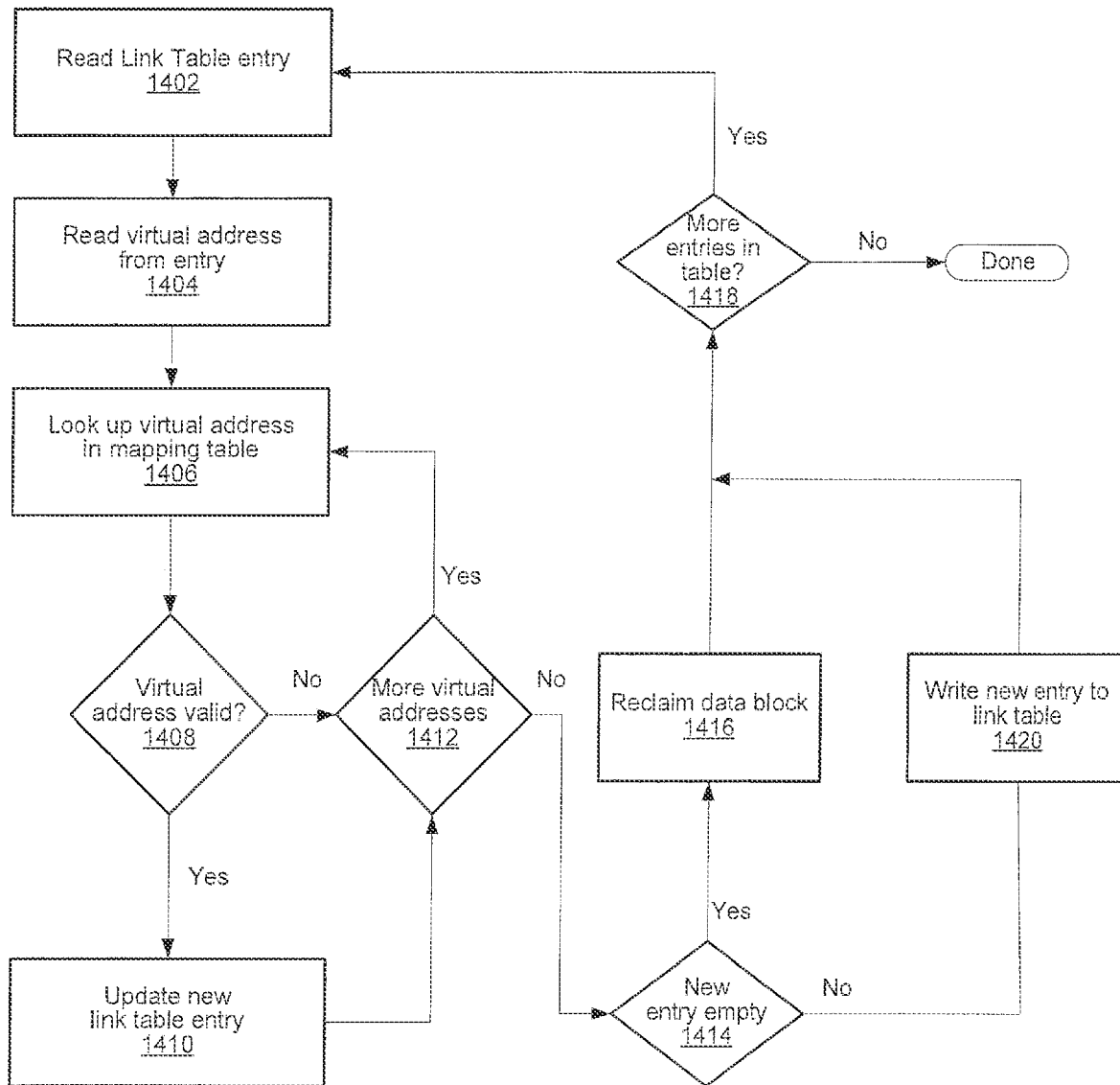
FIG. 14 illustrates one embodiment of a method for performing garbage collection.

FIG. 14 illustrates one embodiment of a portion of a garbage collection process that may, for example, be used in a storage system that supports deduplication. In the example shown, an entry in the link table is read (block 1402) and a virtual address read from the entry (block 1404). Using at least a portion of the virtual address, an access of the mapping table is performed (block 1406) and a determination made as to whether there exists a valid address mapping for the virtual address (decision block 4108). If there is a valid mapping, then a new link table entry is updated to include the mapping (block 1406), and a determination made as to whether there are further virtual addresses to check in the current link table entry (decision block 1408). If so, then the process continues with block 1410. If there is no valid mapping for the virtual address (decision block 1408), the process continues with block 1412. Once there are no further virtual addresses to check for the current link table entry (decision block 1412), then a determination is made as to whether the new entry is empty (i.e., no valid mappings have been found that correspond to the current link table entry (decision block 1414). If the new entry is empty, then the currently allocated block corresponding to the current link table entry may be reclaimed (block 1416). Otherwise, the new entry is written to the link table (block 1420). If there are more link table entries to examine (decision block 1418), then the process may proceed with block 1402. In addition to reclaiming storage, this process may serve to consolidate link table mapping entries into fewer entries.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a storage device;
   a first fingerprint table and a second fingerprint table, the first table configured to store entries corresponding to data stored in the storage device which has been deemed to be more likely to be successfully deduplicated than other data in the storage device, the second fingerprint table configured to store entries corresponding to data stored in the storage device which has been deemed to be less likely to be successfully deduplicated than other data in the storage device.

2. The system as recited in claim 1, further comprising:
   a storage controller coupled to the storage device, the storage controller configured to:
   maintain attributes corresponding to usage of data objects storage in the storage device;
   read the attributes corresponding to the objects, responsive to detecting an event, and modify one of the first fingerprint table or the second fingerprint table.

3. The system as recited in claim 2, wherein the attributes comprise at least one of, access, data age, device performance, device heath, error correction use data, deduplication rate, or read shift voltage.

4. The system as recited in claim 2, wherein the event comprises one of a garbage collection operation, a health binning operation, a block calibration operation, a device access operation and a wear levelling operation.

5. The system as recited in claim 1, wherein the data includes patterns.

6. The system as recited in claim 1, wherein the system is a flash system.

7. The system as recited in claim 1, wherein the entries comprise hashes.

8. A method comprising:
   selecting a first table for storage of an entry corresponding to data stored in a data storage medium, responsive to determining the data being more likely to be successfully deduplicated than other data in the storage device; and
   selecting a second table for storage of an entry corresponding to data stored in a data storage medium, responsive to determining the data being less likely to be successfully deduplicated than other data in the storage device.

9. The method of claim 8, wherein a storage controller is coupled to the storage device, the storage controller configured to:
   maintain attributes corresponding to usage of data objects storage in the storage device;
   read the attributes corresponding to the objects, responsive to detecting an event, and
      modify one of the first fingerprint table or the second fingerprint table.

10. The method of claim 9, wherein the attributes comprise at least one of, access, data age, device performance, device heath, error correction use data, deduplication rate, or read shift voltage.

11. The method of claim 9, wherein the event comprises one of a garbage collection operation, a health binning operation, a block calibration operation, a device access operation and a wear levelling operation.

12. The method of claim 8, wherein the data includes patterns.

13. The method of claim 8, wherein the first entry comprises a hash.

14. A non-transitory computer readable storage medium comprising program instructions, wherein said program instructions are executable to:
   selecting a first table for storage of an entry corresponding to data stored in a data storage medium, responsive to determining the data being more likely to be successfully deduplicated than other data in the storage device; and
   selecting a second table for storage of an entry corresponding to data stored in a data storage medium, responsive to determining the data being less likely to be successfully deduplicated than other data in the storage device.

15. The non-transitory computer readable storage medium of claim 14, wherein a storage controller is coupled to the storage device, the storage controller configured to:
   maintain attributes corresponding to usage of data objects storage in the storage device;
   read the attributes corresponding to the objects, responsive to detecting an event, and
      modify one of the first fingerprint table or the second fingerprint table.

16. The non-transitory computer readable storage medium of claim 15, wherein the attributes comprise at least one of, access, data age, device performance, device heath, error correction use data, deduplication rate, or read shift voltage.

17. The non-transitory computer readable storage medium of claim 15, wherein the event comprises one of a garbage collection operation, a health binning operation, a block calibration operation, a device access operation and a wear levelling operation.

18. The non-transitory computer readable storage medium of claim 14, wherein the data includes patterns.

19. The non-transitory computer readable storage medium of claim 14, wherein the entry comprises a hash.

20. The non-transitory computer readable storage medium of claim 14, wherein the data storage medium is flash storage.

* * * * *